US011756546B2

(12) United States Patent
Shah et al.

(10) Patent No.: US 11,756,546 B2
(45) Date of Patent: *Sep. 12, 2023

(54) REGULATING ASSISTANT RESPONSIVENESS ACCORDING TO CHARACTERISTICS OF A MULTI-ASSISTANT ENVIRONMENT

(71) Applicant: Google LLC, Mountain View, CA (US)

(72) Inventors: Raunaq Shah, San Francisco, CA (US); Jaclyn Konzelmann, Mountain View, CA (US); Lisa Takehana, San Bruno, CA (US); Ruxandra Davies, Santa Monica, CA (US); Adrian Diaconu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/346,797

(22) Filed: Jun. 14, 2021

(65) Prior Publication Data

US 2021/0304764 A1    Sep. 30, 2021

Related U.S. Application Data

(63) Continuation of application No. 16/343,934, filed as application No. PCT/US2018/047762 on Aug. 23, 2018, now Pat. No. 11,037,562.

(51) Int. Cl.
G10L 15/22    (2006.01)
G06F 3/16    (2006.01)

(52) U.S. Cl.
CPC .............. *G10L 15/22* (2013.01); *G06F 3/167* (2013.01); *G10L 2015/221* (2013.01); *G10L 2015/223* (2013.01)

(58) Field of Classification Search
CPC .............. G10L 15/22; G10L 2015/221; G10L 2015/223; G06F 3/167; G06F 1/1605;
(Continued)

(56) References Cited

U.S. PATENT DOCUMENTS 8,849,652 B2 * 9/2014 Weider .................. G06F 16/951
704/9
8,995,981 B1 * 3/2015 Aginsky ........... H04M 1/72415
455/419

(Continued)

FOREIGN PATENT DOCUMENTS

EP    1933499        6/2008
EP    1933499 A1 *   6/2008     ........... H04L 41/082
(Continued)

OTHER PUBLICATIONS

European Patent Office; Communication pursuant to Article 94(3) issued in Application No. 18765523.8, 4 pages, dated Mar. 2, 2022.
(Continued)

*Primary Examiner* — Mohammad K Islam
(74) *Attorney, Agent, or Firm* — Gray Ice Higdon

(57) ABSTRACT

Implementations set forth herein relate to employing dynamic regulations for governing responsiveness of multiple automated assistant devices, and specifically the responsiveness an automated assistant to a given spoken utterance that has been acknowledged by two or more of the assistant devices. The dynamic regulations can be context-dependent and adapted over time in order that the automated assistant can accommodate assistant interaction preferences that may vary from user to user. For instance, a spoken utterance such as "stop," may be intended to affect different assistant actions based on a context in which the user provided the spoken utterance. The context can refer to a location of the user relative to other rooms in a home, a time of day, a user providing the spoken utterance, an arrange-
(Continued)

ment of the assistant devices within a home, and/or a state of each device in the home.

18 Claims, 10 Drawing Sheets

(58) Field of Classification Search
CPC ... G06F 1/1643; G06F 3/0412; H04M 1/72533; H04R 1/083; H04R 27/00
See application file for complete search history.

(56) References Cited

U.S. PATENT DOCUMENTS

| | | | |
|---|---|---|---|
| 9,345,054 B1* | 5/2016 | Lu | H04M 1/72415 |
| 9,443,527 B1* | 9/2016 | Watanabe | G10L 15/26 |
| 9,990,129 B2* | 6/2018 | Yang | G06F 3/0482 |
| 10,157,042 B1* | 12/2018 | Jayakumar | H04R 27/00 |
| 10,237,237 B2* | 3/2019 | Dawes | G06F 3/0412 |
| 10,410,630 B2* | 9/2019 | Weng | G06F 3/167 |
| 10,748,546 B2* | 8/2020 | Kim | G06F 3/167 |
| 11,037,562 B2 | 6/2021 | Shah et al. | |
| 2004/0210647 A1* | 10/2004 | Jin | H04L 12/2823 709/220 |
| 2009/0313026 A1* | 12/2009 | Coffman | H04M 3/50 704/275 |
| 2012/0130513 A1* | 5/2012 | Hao | G05B 15/02 700/90 |
| 2013/0211710 A1* | 8/2013 | Kennewick | G10L 15/08 701/419 |
| 2014/0135952 A1* | 5/2014 | Maehara | G05B 15/02 700/90 |
| 2014/0324410 A1* | 10/2014 | Mathews | H04L 12/283 703/22 |
| 2015/0256620 A1* | 9/2015 | Sugano | G06F 21/6218 709/217 |
| 2015/0379993 A1* | 12/2015 | Subhojit | G10L 15/06 704/275 |
| 2016/0195856 A1 | 7/2016 | Spero | |
| 2016/0247364 A1 | 8/2016 | Herman et al. | |
| 2016/0283191 A1* | 9/2016 | Lu | G11B 27/105 |
| 2016/0344569 A1* | 11/2016 | Chun | G06F 3/04817 |
| 2017/0055126 A1 | 2/2017 | O'Keeffe | |
| 2017/0083285 A1 | 3/2017 | Meyers et al. | |
| 2017/0105095 A1* | 4/2017 | Um | H04W 4/70 |
| 2017/0116986 A1* | 4/2017 | Weng | G10L 15/22 |
| 2017/0256256 A1* | 9/2017 | Wang | G10L 15/26 |
| 2017/0345422 A1 | 11/2017 | Yang | |
| 2018/0013815 A1* | 1/2018 | Gold | H04M 1/72412 |
| 2018/0122378 A1 | 5/2018 | Mixter et al. | |
| 2018/0137858 A1* | 5/2018 | Saxena | G10L 15/30 |
| 2018/0144748 A1 | 5/2018 | Leong | |
| 2018/0165061 A1* | 6/2018 | Nicolich-Henkin | H04L 12/282 |
| 2018/0182387 A1* | 6/2018 | Chua | G06F 3/167 |
| 2018/0285065 A1* | 10/2018 | Jeong | G06F 3/167 |
| 2018/0285070 A1* | 10/2018 | Yoon | G06F 3/167 |
| 2018/0314490 A1* | 11/2018 | Lee | G10L 15/1815 |
| 2019/0005944 A1* | 1/2019 | Subhojit | G10L 15/07 |
| 2019/0058783 A1* | 2/2019 | Reid | G06F 3/03547 |
| 2019/0215184 A1* | 7/2019 | Emigh | H04L 12/2814 |
| 2019/0287522 A1* | 9/2019 | Lambourne | H04S 7/302 |
| 2019/0304455 A1* | 10/2019 | Jaygarl | G10L 15/08 |
| 2020/0007356 A1* | 1/2020 | Mason | H05B 47/155 |
| 2020/0028734 A1* | 1/2020 | Emigh | H04L 12/282 |
| 2020/0234709 A1* | 7/2020 | Kunitake | G06F 3/167 |

FOREIGN PATENT DOCUMENTS

| | | | |
|---|---|---|---|
| EP | 3300074 | 3/2018 | |
| JP | 201836397 | 9/2019 | |
| JP | 201772857 | 7/2021 | |
| WO | 9859282 | 12/1998 | |
| WO | WO-9859282 A2 * | 12/1998 | ......... H04L 12/2809 |
| WO | 2016026324 | 2/2016 | |
| WO | 2016185809 | 11/2016 | |

OTHER PUBLICATIONS

Intellectual Property India; Office Action issued in Application No. 202027053615; 8 pages; dated Jul. 14, 2021.
European Patent Office; Communication Pursuant to Article 94(3) EPC in Application No. 18765523.8; 9 pages; dated May 14, 2020.
European Patent Office; International Search Report and Written Opinion of PCT Application No. PCT/US2018047762; dated Oct. 25, 2018.
European Patent Office; Summons to attend oral proceedings pursuant to Rule 115(1) EPC issued in Application No. 18765523.8; 8 pages; dated Aug. 12, 2021.
Japanese Office Action; Notice of Reasons for Rejection issued in app. No. 2020-569892, 8 pages, dated Apr. 4, 2022.
Korean Intellectual Property Office: Response to Written Argument submitted for Application No. 10-2020-7035647, 10 pages, dated Feb. 17, 2023.
Japanese Patent Office; Notice of Allowance issued in app. No. 2020-569892, 3 pages, dated Sep. 12, 2022.
Korean Intellectual Property Office; Notice of Office Action issued in Application Ser. No. KR10-2020-7035647; 8 pages; dated Jul. 29, 2022.

* cited by examiner

REGULATING ASSISTANT RESPONSIVENESS ACCORDING TO CHARACTERISTICS OF A MULTI-ASSISTANT ENVIRONMENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Many users may engage automated assistants using multiple client devices. For example, some users may possess a coordinated "ecosystem" of client devices such as one or more smart phones, one or more tablet computers, one or more vehicle computing systems, one or wearable computing devices, one or more smart televisions, and/or one or more standalone interactive speakers, among other client devices. A user may engage in human-to-computer dialog with an automated assistant using any of these client devices (assuming an automated assistant client is installed). In some cases these client devices may be scattered around the user's primary residence, secondary residence, workplace, and/or other structure. For example, mobile client devices such as smart phones, tablets, smart watches, etc., may be on the user's person and/or wherever the user last placed them. Other client devices, such as traditional desktop computers, smart televisions, and standalone interactive speakers may be more stationary but nonetheless may be located at various places (e.g., rooms) within the user's home or workplace.

When a user has multiple automated assistant devices within their home, each respective automated assistant device may have a different operating statuses, as a result of performing different actions. At such times, a user may request to modify a particular action that is ongoing at an automated assistant device, but inadvertently cause a different automated assistant device to modify a different action. This can be in part because some assistant devices may solely rely on whether a respective assistant device heard a user say a command in order to modify a particular action. As a result, the adaptability of the automated assistant devices to certain multi-assistant environments can be limited when the user is not speaking directly to the assistant device they intended to interact with. For instance, the user may accidentally stop an ongoing action being performed at an assistant device they did not intend to communicate with, thereby requiring the user to repeat a previous spoken utterance in order to re-invoke the stopped action.

Undesirably, in response to accidentally stopping an action, memory allocated for the stopped action may be reused by an assistant device, and when the user subsequently re-invokes the stopped action, the assistant device may have to acquire any relevant data again. Such seemingly redundant consequences can waste network resources because, for example, some spoken utterances may be processed by natural language models that are only accessible via a network connection. Furthermore, any data relevant to an inadvertently canceled action would have to be re-downloaded in furtherance of completing the action, and any energy wasted from canceling an energy-intensive action (e.g., controlling display backlighting, heating elements, and/or motorized appliances) may not be recoverable.

SUMMARY

The present disclosure is generally directed to methods, apparatus, and computer-readable media (transitory and non-transitory) for employing dynamic regulations for governing responsiveness of multiple automated assistant devices. Specifically, the responsiveness of an automated assistant to a given spoken utterance that has been acknowledged by two or more of the assistant devices can be adapted according to the dynamic regulations. A dynamic regulation can be a rule for permitting a particular automated assistant device to perform a particular action according to given context, which can change over time. Additionally, or alternatively, each automated assistant device can operate according to multiple different dynamic regulations that govern an ability of an automated assistant to delegate a particular action for performance to a particular automated assistant device. Such dynamic regulations can identify certain contexts in which a particular automated assistant device will perform a particular action, such as when multiple automated assistant devices simultaneously acknowledge an incoming request for the particular action to be performed.

As an example, a user can be listening to music in their living room through a first assistant device, while a second assistant device can be set to provide an alarm in a kitchen in order to alert the user of the progress of their cooking. When the alarm goes off, the user can provide a spoken utterance to the second assistant device to modify an action corresponding to the alarm going off. For instance, the user can provide the spoken utterance, "Assistant, stop!" from their living room, but intend the spoken utterance to affect the second assistant device. Because the user is in their living room, the first assistant device can receive the spoken utterance at a higher volume compared to the second assistant device that is in the kitchen. However, in order to stop the ongoing alarm action at the second assistant device without affecting an ongoing music playing action at the first assistant device, the first assistant device can access one or more dynamic regulations before affecting any ongoing action.

The dynamic regulations can be associated with a current context of the user, which can be characterized by contextual data that indicates a location of the user in the living room, a location of each assistant device within the living room and kitchen, respectively, and/or each ongoing action being performed at each assistant device, respectively. For instance, a dynamic regulation can be based on training data that indicates the user has historically provided the spoken utterance "stop" after the second assistant device emits an alarm sound, and/or within a threshold period of time (e.g., 5 seconds) within the second assistant device emitting the alarm sound. This dynamic regulation can provide a basis from which the automated assistant can determine whether or not to stop the music in response to the spoken utterance "Assistant, stop" within the current context. For instance, in response to the spoken utterance "Assistant, stop," the automated assistant can access the dynamic regulation, determine that the spoken utterance was provided within a threshold period of time of the alarm sounding, and modify the alarm action of the second assistant device. In other words, despite the music playing and the alarm sounding concurrently at different assistant devices, the automated assistant will only affect the alarm sounding, at least based on the dynamic regulation and the current context.

In some implementations, training data can be used as a basis from which to generate and/or modify dynamic regulations over time. Training data can be based on a variety of different spoken utterances provided by a user in order to initialize and/or modify one or more ongoing actions being performed by one or more applications and/or devices. For instance, a dynamic regulation can be generated based on the automated assistant acknowledging that the user has provided one or more corrective spoken utterances within similar contexts. A corrective spoken utterance can be provided by a user in response to the automated assistant modifying a particular action incorrectly relative to an intention of the user. As an example, the user may have previously provided a spoken utterance "Assistant, stop" after the second assistant device, identified above, began emitting the alarm, and the automated assistant may have incorrectly stopped the ongoing music playing action at the first assistant device in response. In order to resolve the incorrect modification of the music playing action, the user can provide the corrective spoken utterance, "No, stop the alarm." In response, the automated assistant can process the corrective spoken utterance, begin the music playing action again, and stop the alarm action. Furthermore, the automated assistant can cause a dynamic regulation to be generated that characterizes the current context and a preference of the user to only stop the alarm when the user says "stop" while both the alarm and the music are audible, and optionally, when the user is located in the living room when saying "stop." In this way, the user would not have to continue providing corrective spoken utterances with respect to that context, thereby preserving computational resources that would otherwise be expended on language processing and signaling between assistant devices to comply with the corrective spoken utterances.

In some implementations, a dynamic regulation can have one or more contextual dependencies. A contextual dependency can refer to a characteristic of a particular context that influences whether a particular action will be initialized and/or modified given the particular context. As an example, a dynamic regulation can identify occupancy-related data that must be satisfied in order for a particular action to be performed within a particular room of a home of the user. For instance, when a person (e.g., a sleeping baby) is detected within a bedroom of the home, the user may prefer to not disturb the person with sound past a particular time (e.g., 6 PM). Accordingly, a dynamic regulation can identify one or more rooms, one or more affected actions (e.g., playing music, emitting alarms, otherwise making noise, etc.), one or more affected assistant devices, one or more affected accounts, one or more output modalities associated with an action, one or more output modalities available at an assistant device, and/or any other features that can be associated with an automated assistant. Specifically, according to the above example, a corresponding dynamic regulation can identify the bedroom of the home, the assistant device that is located within the bedroom, and the particular time after which certain actions are limited. Therefore, when the automated assistant receives a request for an action to be performed, the automated assistant can access the dynamic regulation in order to ensure that the automated assistant acts within the limitations established by the dynamic regulation.

In some implementations, a dynamic regulation for controlling one or more assistant devices can be based on whether a first assistant device identified in a given context is associated with two or more users. Furthermore, when the first assistant device is associated with two or more users, a second assistant device identified within the given can be controlled by the two or more users, despite the second assistant device not being immediately and/or directly associated with the two or more users. As an example, two users can be watching a movie on a television in a living room of a home of a first user, and each of the two users can be identified in each other's respective portable computing devices as contacts. Specifically, a second user of the two users can have a history of using their portable computing device to call the first user of the two users.

While watching the movie, the first user may leave the living room to grab a snack, and the second user, observing the first user walking away, can provide a spoken utterance to an automated assistant interface of the television in order to pause the movie. For instance, the second user can provide the command, "Assistant, pause," to the automated assistant interface (e.g., a microphone) of the television. In response, an automated assistant that operates according to an account of the first user can access and/or generate a dynamic regulation for permitting the second user to control playback of the movie while the second user and the first user are in the home of the first user. Specifically, the dynamic regulation can require that, when the first user has the second user as a contact in their portable computing device and both the first user and the second user are in the home of the first user, the second user can control movie playback. In some implementations, the second user can be identified by the automated assistant by determining that the portable computing device of the second user is connected to a home WiFi of the home of the user, and/or that the portable computing device also heard the spoken utterance provided by the second user. Additionally, or alternatively, the automated assistant can determine that the portable computing device of the second user is located within a threshold distance of the second user when the second user is providing the spoken utterance, at least in order to verify that the second user is providing the spoken utterance.

In some implementations, in response to permitting the second user to pause the movie being played at the television, the automated assistant can modify a dynamic regulation that is associated with pausing movies at the television to permit the second user to pause movies. In this way, the automated assistant can adapt dynamic regulations to relax particular regulations, and therefore preserve computational resources. For instance, once the dynamic regulation has been updated and the second user issues another request to the television, the automated assistant would not need to confirm any correspondence between the portable computing devices of the first user and the second user. Rather, the automated assistant may only need to verify the presence of the second user, or their respective device, within the home or that both the first user and the second user are within the home and/or a common room (e.g., both in the living room).

In some implementations, a contextual dependency of a dynamic regulation can be based on a stored layout for a location of one or more automated assistant devices. A stored layout can characterize room adjacency, room quantity, room size, location of devices within each respective room, most occupied portions of each particular room (e.g., a heat graph per user and/or per room), and/or any other characteristic associated with a location. Additionally, or alternatively, a contextual dependency of a dynamic regulation can be based on a particular assistant device that received a particular spoken utterance, available modalities of assistant devices within a particular location, actions capable of being perform by each assistant device, and/or any other contingency that can be associated with an action of an assistant device. For example, a user can have an audio-only assistant device in their kitchen and an assistant-enabled television in their living room. An automated assistant for the user can operate according to a dynamic regulation that permits the assistant-enabled television to be controlled from the audio-only assistant device when the user provides a request that corresponds to a modality-specific action. For example, while the user is in their kitchen and the children of the user are in the living room, the user can ask the audio-only assistant device in their kitchen to play a kid's movie on the television, without explicitly specifying the device. The spoken utterance can be, for example, "Assistant, play a kid's movie," and in response to the audio-only assistant device receiving the spoken utterance, the audio-only assistant device can identify a related dynamic regulation. The identified dynamic regulation can permit the audio-only assistant device to control other assistant devices with a video modality, when the user provides a video-related request to the audio-only assistant device in their kitchen.

In some implementations, a request from a user that does not specify a particular assistant device, a particular modality, a location for an action to be performed, or otherwise contains ambiguous language, the automated assistant can identify one or more dynamic regulations in order to resolve the ambiguity. In some instances, a request can be considered ambiguous when the request identifies an assistant device that has the same description has another assistant device. For example, a user can have two or more assistant-enabled televisions in their home in two or more difference locations, respectively. Therefore, a spoken utterance such as, "Assistant, play the movie Pi on my television" can be considered ambiguous, as it can be interpreted to refer to multiple devices. As a result, when the automated assistant receives a request that identifies a single assistant device, but ambiguously refers to multiple assistant devices, the automated assistant can access one or more dynamic regulations to resolve the ambiguity.

As an example, in response to receiving the aforementioned spoken utterance, the automated assistant can determine that the spoken utterance includes an ambiguity with respect to a particular type of device (e.g., "television"), and access a dynamic regulation corresponding to ambiguities related to the particular type of device. The accessed dynamic regulation can indicate that, when the user is in their kitchen and requests that a movie by played on their television, the user prefers that the movie be played at their living room television rather than their bedroom television or a kid's room television. In some implementations, this dynamic regulation can be different according to the user that is providing the spoken utterance. Therefore, if one of the kids is providing the spoken utterance in the kitchen, the automated assistant can cause a movie to start playing at the kid's room television rather than the living room television.

In some implementations, a selection for an assistant device to perform a requested action corresponding to a spoken utterance can be based on a degree to which the assistant device heard the spoken utterance relative to other assistant devices. For instance, a user that provides a spoken utterance from their kitchen, will likely cause an assistant device in their kitchen to perform a particular action, at least over a different assistant device that is located in a different room of the house. Additionally, or alternatively, an automated assistant can select candidate assistant devices from a collection of assistant devices in a home of the user according to which assistant devices acknowledged a spoken utterance. Thereafter, the automated assistant can compare degrees to which each candidate assistant device heard the spoken utterance and select the assistant device that heard the spoken utterance to the highest degree.

As an example, the automated assistant can select the candidate assistant devices based on whether they heard the user say the spoken utterance at all, and then identify a volume level at which each assistant device heard the spoken utterance. The automated assistant can determine a tolerance level based on a highest-determined volume level, and further reduce the number of candidate assistant devices being considered. Any remaining candidate assistant devices whose corresponding determined volume level falls within the tolerance can be further analyzed to identify a most appropriate assistant device for performing the requested action. For instance, the user may provide a spoken utterance requesting that music play at a targeted assistant device, but that targeted assistant device may not have been the assistant device that heard the spoken utterance the loudest. However, the targeted assistant device can fall into a group of candidate assistant devices that have acknowledged that the spoken utterance was received within a particular threshold tolerance. Identifiers for the candidate assistant devices can be compared to one or more dynamic regulations related to the requested action (e.g., playing music) in order to determine a most user-preferred assistant device to perform the requested action using additional data (e.g., contextual data).

In some implementations, a trajectory of a user when providing a particular spoken utterance can be identified for one or more dynamic regulations. In this way, a trajectory of a user that is moving while providing a spoken utterance can be a limiting factor for identifying an assistant device that will perform an action requested by the user. As an example, a dynamic regulation can indicate how to process a spoken utterance such as "Assistant, stop," when the user is walking in their house, music is playing at a first assistant device, and an alarm is being emitted a second assistant device. Because an alarm can be associated with something that needs attention, such as an oven being on for an amount of time, the user may have a history of walking toward a source of the alarm sound when providing the "stop" request. A dynamic regulation can capture this learned habit of the user in order to prevent the music from being stopped by the user, when the user really intended the alarm to be stopped.

In some implementations, the dynamic regulations can operate according to one or more machine learning models that are configured to receive, as input, contextual data associated with a context of a particular spoken utterance. For instance, contextual data can be provided to a machine learning model for deriving an output that would otherwise be indicated by a dynamic regulation. The contextual data can characterize a layout of a home, an identifier for one or more users in the home, an identifier for one or more assistant devices in the home, a location of each assistant device within the home, adjacency data corresponding to each room in the home, a location of each person in the home, a time of day, a status of each device within the home, voice characteristics derived from audio that is based on the spoken utterance, a type of ongoing action being performed by each device (e.g., a passive action, an active action, etc.), and/or any other data that can describe a context in which a user provides a particular spoken utterance. In this way, each assistant device can seemingly adapt to changes in preferences of the user for certain automated assistant devices to perform particular actions.

A process for selecting an assistant device that will ultimately perform an action specified by a spoken utterance can be executed at one or more remote computing devices, such as one or more server devices that operate at a separate network from the assistant devices. In other words, the process for selecting a preferred assistant device to perform an action can include selecting a particular server device, or a designated co-located cluster of server devices that will process inputs for identifying the preferred assistant device. For example, each assistant device can provide status information to a respective server device, or co-located cluster of server devices, that is associated with each assistant device. Each assistant device can be associated with different server devices as a result of each assistant device being associated with one or more different accounts and/or one or more different users. Therefore, in order to streamline delegation of actions to an automated assistant, a particular server device can be selected for the other server devices to response to a particular spoken utterance that is received at multiple assistant devices. For instance, a first assistant device can provide status information to a first server device, and a second assistant device can provide other status information to a second server device. The first server device can be designated as the selected server device for processing status information and selecting a targeted assistant device, at least based on the first automated assistant hearing a spoken utterance the loudest. Thereafter, the second server device and/or the second assistant device can determine that the first server device has been designated as the selected server device and forward the other status information, and/or any other data related to the spoken utterance, to the first server device. The first server device can then use the status information, which can include contextual data associated with the spoken utterance, in order to designate one of the assistant devices to perform the action inferred from the spoken utterance.

Implementations of the present disclosure provide a way to improve the control of a group of devices in a particular environment such that the number of incorrect device-triggering instances is reduced. This causes a reduction in wastage of technical resources, which would otherwise be associated with the execution of the incorrect device-triggering, in addition to ensuring that the result of a user command corresponds to the user's intention. Such wastage of resources may include, but is not limited to, communication overheads associated with instructing a device to perform a particular function which is not required to be performed, the power consumed by activating a particular function in a device which is not intended to be controlled, and the memory and/or power consumed by suspending a device in a particular state which is not required. Instances of correct device-triggering can occur more quickly, ensuring that the automated assistant operates more responsively.

Effectiveness is further ensured by taking into account contextual information for a plurality of devices, such that device control is achieved on a dynamic basis, appropriate to particular environments.

Through training a database of dynamic regulations, it can be ensured that the system is able to learn a user's behavior so that it can improve the efficiency with which device control can be achieved, yet further reducing instances of incorrect device-triggering, and ensuring that future conflicts in device control will be resolved as effectively as possible.

The above description is provided as an overview of some implementations of the present disclosure. Further description of those implementations, and other implementations, are described in more detail below.

In some implementations, a method implemented by one or more processors is set forth as including operations such as receiving audio data that captures a spoken utterance of a user, wherein the spoken utterance embodies a request for a modification action to be performed via an automated assistant and is received by at least one of two or more computing devices that are each capable of performing the modification action via the automated assistant. The method can further include determining, using the audio data that captures the spoken utterance, that the modification action is capable of modifying each of: a first ongoing action being performed at a first device of the two or more computing devices, and a second ongoing action being performed at a second device of the two or more computing devices. The method can also include identifying, based on determining that the modification action is capable of modifying both the first ongoing action and the second ongoing action, a stored regulation that corresponds to the modification action, wherein the stored regulation characterizes a contextual dependency of performance of the modification action. The method can further include accessing, based on identifying the stored regulation, contextual data that is associated with the stored regulation, wherein the contextual data characterizes a first type of the first ongoing action and a second type of the second ongoing action. The method can also include determining, based on the contextual data and the stored regulation, a target computing device, of the two or more computing devices, at which the modification action is to be performed via the automated assistant. The method can further include causing, based on determining the target computing device at which the action is to be controlled, the modification action to be performed at the target computing device via the automated assistant.

In some implementations, determining the stored regulation includes identifying the stored regulation from multiple different regulations accessible to the automated assistant, and the multiple different regulations are determined based on one or more previous instances of the user requesting the automated assistant perform the modification action. In some implementations, the stored regulation is determined based on one or more corrective spoken utterances previously received by the automated assistant from the user, each of the one or more corrective spoken utterances being provided by the user subsequent to a corresponding previous instance of the modification action being incorrectly executed via the automated assistant, as indicated by the corrective spoken utterance. In some implementations, the first ongoing action includes providing audible sound via a speaker of the first device.

In some implementations, the contextual data includes occupancy data that characterizes an occupancy of one or more rooms, of a building in which the user provided the spoken utterance, and the stored regulation indicates a preference of the user for limiting at least one action with respect to a particular room of the one or more rooms of the building. In some implementations, the contextual data further indicates a location of the user within the particular room of the one or more rooms of the building, and the stored regulation indicates another preference of the user for the target computing device to control the at least one action via the automated assistant. In some implementations, causing the modification action to be performed at the target computing device includes limiting performance of a particular ongoing action at the target computing device of the two or more computing devices. In some implementations, causing the at least one action to be performed at the target computing device includes modifying an ongoing rendering of audio data or visual data, and the contextual data indicates a time at which the going rendering of the audio data or visual data was initialized. In some implementations, the contextual data identifies an operating status for each computing device of the two or more computing devices, and each computing device of the two or more computing devices are configured to provide respective operating status data to a common co-located cluster of server devices for processing the operating status.

In other implementations, a method implemented by one or more processors is set forth as including operations such as determining, at a server device that is in communication with multiple client devices, status information corresponding to activity states of multiple client devices, which are disposed about a location of a user, wherein each client device of the multiple client devices is accessible to an automated assistant. The method can also include receiving data that is based on a spoken utterance, provided by the user, to at least one client device of the multiple client devices that is operating according to the determined status information, wherein the spoken utterance embodies a request for an action to be performed by one or more client devices of the multiple client devices. The method can further include accessing, in response to receiving the data that is based on the spoken utterance, a stored set of dynamic regulations associated with the multiple client devices, wherein at least one stored regulation of the stored set of dynamic regulations characterizes a contextual dependency of execution of the action, by the one or more client devices, on the status information. The method can also include identifying, based on the at least one stored regulation of the stored set of dynamic regulations and the status information, a targeted client device to perform the action, wherein the contextual dependency characterized by the at least one stored regulation includes at least one volume-agnostic condition for designating the targeted client device to perform the action. The method can further include causing the targeted client device to perform the action via the automated assistant.

In some implementations, the location includes multiple rooms characterized by a stored topology that is accessible to the server device, and the method further includes: accessing current contextual data that characterizes the contextual dependency as the user being located within a first room that includes the at least one client device, and the targeted client device being located within a second room of the multiple rooms. In some implementations, the method can include determining, based on receiving the data, whether the spoken utterance is as at least one type of utterance selected from an ambiguous type of utterance and a specific type of utterance, wherein particular operations of accessing the stored set of dynamic regulations associated with the multiple client devices, identifying a targeted client device to perform the action, and causing the targeted computing device to perform the action are performed when the spoken utterance is determined to be the ambiguous type of utterance.

In some implementations, the method can include, when the spoken utterance is determined to be a specific type of utterance: identifying a designated client device, specifically identified by the user via the spoken utterance, and causing the designated client to perform the action while bypassing accessing the stored set of dynamic regulations associated with the multiple client devices. In some implementations, characterizing the received spoken utterance as at least one type of utterance selected from the ambiguous type of utterance and the specific type of utterance is based on previous interactions between the user and the automated assistant.

In yet other implementations, a method implemented by one or more processors is set forth as including operations such as receiving status information from multiple client devices associated with a user, the status information indicating that one or more client devices of the multiple client devices are performing an ongoing action. The method can also include selecting, based on receiving the status information, a designated co-located cluster of server devices for processing the status information provided the multiple client devices, wherein the designated co-located cluster of server devices is selected from multiple different co-located clusters of server devices. The method can further include determining that a spoken utterance from the user was received at an automated assistant interface of a client device of the multiple client devices, wherein the automated assistant interface is configured to facilitate interactions between the user and an automated assistant that is accessible to the multiple client devices, and the spoken utterance embodies a request for the automated assistant to perform an action. The method can also include causing audio data, generated at the client device, to be provided to the designated co-located cluster of server devices in response to determining that the spoken utterance was received from the user at the automated assistant interface of the client device, wherein the audio data captures at least a portion of the spoken utterance. The method can further include causing, based on the client device providing the audio data to the designated co-located cluster of server devices, the designated co-located cluster of server devices to identify a designated client device of the multiple client devices for performing the action requested by the user. The method can also include causing the designated client device to perform the action requested by the user.

In some implementations, the method can include accessing, in response to receiving the status information, a stored device topology that indicates an arrangement of various client devices within a location, wherein the multiple client devices are a subset of the various client devices, and determining that the multiple client devices are in a common room of the location where the user provided the spoken utterance to the automated assistant interface. In some implementations, the action corresponds to a particular output modality, and the method further comprises: determining that the multiple client devices that are in the common room of the location include the particular output modality corresponding to the action identified by the request. In some implementations, two or more client devices of the multiple client devices are associated with different user accounts, and the two or more client devices are configured to communicate with the multiple different co-located clusters of server devices based on the two or more client devices being associated with different user accounts. In some implementations, particular status information provided by a respective client device indicates whether the respective client device of the multiple client devices is performing an ongoing action and, when the respective client device is performing the ongoing action, the status information indicates a modality of the respective client device being employed to perform the ongoing action. In some implementations, the designated client device is selected according to stored training data that indicates a correspondence between the action identified by the request and the status information provided by the multiple client devices.

In some implementations, a device is set forth as include audio interface configured to generate a signal in response to receiving a spoken utterance that is received in furtherance of a user communicating with an automated assistant, wherein the spoken utterance is received at both the audio interface and another audio interface of another client device, and the other client device is a client device that is one of multiple client devices accessible to the automated assistant. The device can also include a network interface configured to receive a communication from the other device that also received the spoken utterance, wherein the communication provided by the other device includes first contextual data that characterizes a context associated with the other device. The device can further include memory configured to store second contextual data that characterizes another context associated with the spoken utterance being received at the audio interface. The device can also include one or more processors configured to perform operations that include: determining rankings for the multiple client devices, wherein the rankings include at least a first rank based on the first contextual data and a second rank based on the second contextual data, and wherein each rank of the rankings at least partially influences a selection of a particular device of the multiple client devices to respond to the spoken utterance via the automated assistant, and when a candidate device of the multiple client devices has a corresponding rank that is distinguished from other ranks of the rankings: causing, at least based on the corresponding rank of the rankings, the automated assistant to respond to the spoken utterance via the candidate device.

In some implementations, the network interface is further configured to receive the communication from the other device before the spoken utterance is received at the audio interface. In some implementations, determining the rankings by the one or more processors is performed before the spoken utterance is received at the audio interface or while the spoken utterance is being received at the audio interface. In some implementations, the one or more processors are further configured to perform operations that include: generating the second contextual data before the spoken utterance is received at the audio interface, and causing the network interface to provide a separate communication to the other device, wherein the other device is configured to determine whether the other device will be tasked with responding to the spoken utterance via the automated assistant. In some implementations, the one or more processors are further configured to perform operations that include: sending a separate communication to a separate device that, is in communication with the network interface but, has not acknowledged the spoken utterance, and determining whether the separate device will be tasked with responding to the spoken utterance via the automated assistant.

In some implementations, the one or more processors are further configured to perform operations that include: generating third contextual data that characterizes an operating status of the separate device. In some implementations, the one or more processors are further configured to perform operations that include: when two or more client devices of the multiple client devices have respective ranks that cause a tie ranking between the two or more client devices: determining supplemental contextual data that characterizes traits of the two or more client devices, and causing, based on the supplemental contextual data, the tie ranking to be resolved in a favor of a respective client device whose ranking is distinguished from rankings of other client devices of the multiple client devices.

In some implementations, a method implemented by one or more processors is set forth as including operations such as determining that a spoken utterance has been received at a first client device, wherein the spoken utterance is provided by a user in furtherance of communicating with an automated assistant that is accessible via an assistant interface of the first client device, and the spoken utterance is received by multiple client devices that include the first client device. The method can also include receiving, from a second client device that received the spoken utterance, a communication in response to the second client device receiving the spoken utterance, wherein the communication provided by the second client device includes first contextual data that characterizes a context associated with the second client device. The method can further include determining other contextual data that characterizes another context associated with the first client device. The method can also include determining rankings for the multiple client devices, wherein the rankings include at least a first rank based on the first contextual data and a second rank based on the second contextual data, and wherein each rank of the rankings at least partially influences a selection of a particular client device of the multiple client devices to respond to the spoken utterance. The method can further include, when a candidate client device of the multiple client devices has a corresponding rank that is distinguished from other ranks of the rankings: causing, at least based on the corresponding rank of the rankings, the automated assistant to respond to the spoken utterance via the candidate device.

In some implementations, the communication is received from the second client device before the spoken utterance is by the first client device. In some implementations, determining the rankings is performed before the spoken utterance is received at the first client device or while the spoken utterance is being received at the first client device. In some implementations, the method can include generating the second contextual data before the spoken utterance is received at the audio interface, and causing the network interface to provide a separate communication to the other device, wherein the other device is configured to determine whether the other device will be tasked with responding to the spoken utterance via the automated assistant. In some implementations, the method can include sending a separate communication to a separate device that, is in communication with the first client device but, has not acknowledged the spoken utterance, and determining whether the separate device will be tasked with responding to the spoken utterance via the automated assistant. In some implementations, the method can include generating third contextual data that characterizes an operating status of the separate device. In some implementations, the method can include when two or more client devices of the multiple client devices have respective ranks that cause a tie ranking between the two or more client devices: determining supplemental contextual data that characterizes traits of the two or more client devices, and causing, based on the supplemental contextual data, the tie rank to be resolved in a favor of a respective client device whose ranking is distinguished from rankings of other client devices of the multiple client devices.

In other implementations, a method implemented by one or more processors is set forth as including operations such as storing a plurality of dynamic regulations in a database, each dynamic regulation associated with a user command, and specifying a correspondence between each of a plurality of controlled devices to perform an action corresponding to the user command, and contextual information for the user and/or at least one of the plurality of client devices including the respective controlled device. The method can also include training the stored plurality of regulations by: receiving a first input representing a user command from one of a plurality of client devices, identifying one of the plurality of stored dynamic regulations corresponding to the received user command, requesting and obtaining contextual information for the user and/or at least one of the plurality of client devices including the controlled device, identifying a client device of the plurality of client devices as the controlled device based on the contextual information associated with the stored dynamic regulation, initiating execution of the identified dynamic regulation by the identified client device, receiving a second input representing an update of the user command from the one of the plurality of client devices, the correction specifying an updated client device to be controlled, and updating the stored dynamic regulation in the database to specify correspondence between the updated client device and the obtained contextual information. The method can also include initiating execution of the identified dynamic regulation by the updated client device.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A and FIG. 3B illustrate system diagrams for selecting a server that will determine a targeted client device at which a particular spoken utterance will be responded to.

DETAILED DESCRIPTION

Figure 1A:
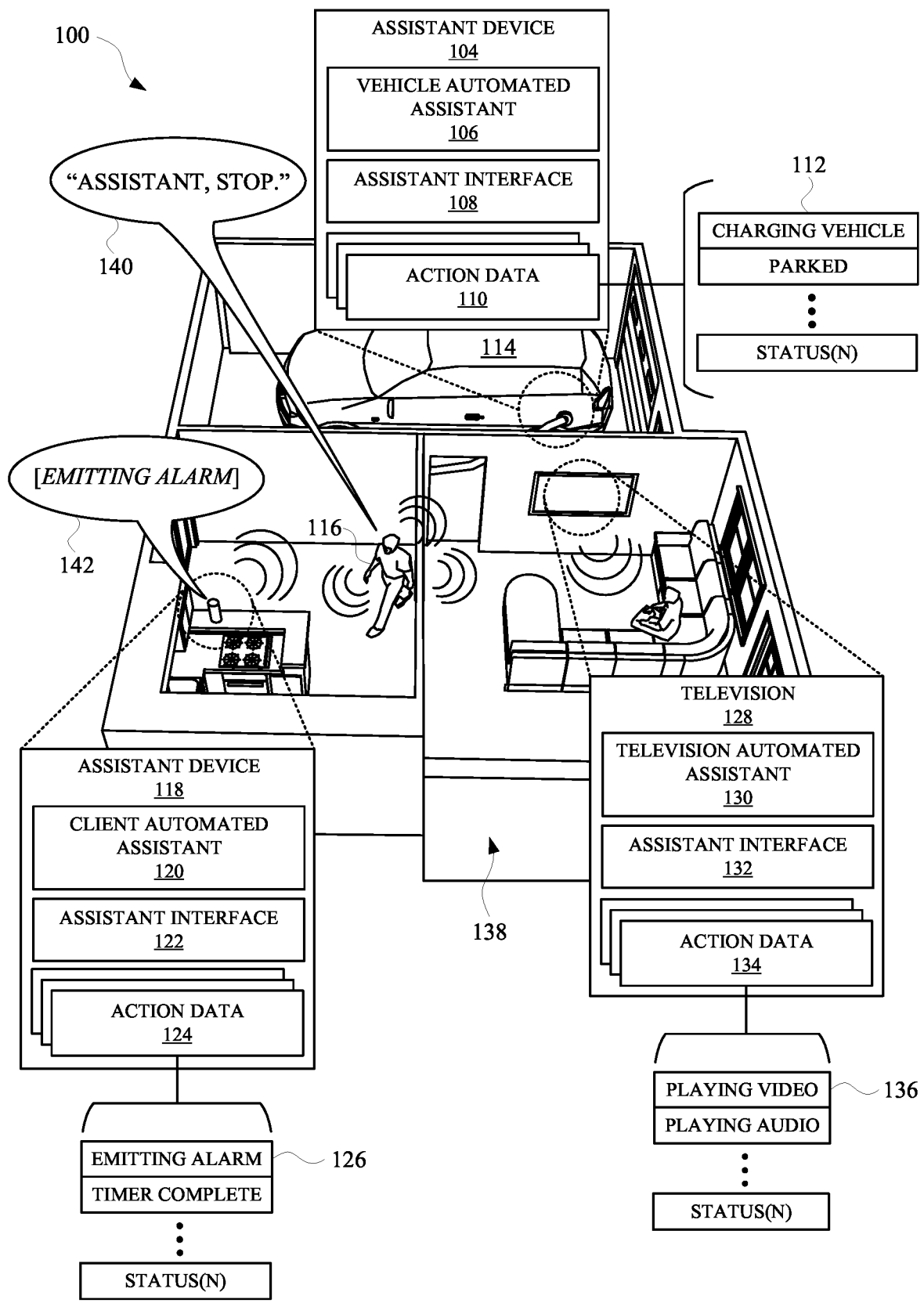
FIG. 1A illustrates a perspective view of a user providing a spoken utterance within a location that includes multiple different assistant devices.

FIG. 1A illustrates a perspective view 100 of a user 116 providing a spoken utterance 140 within a location 138 that includes multiple different assistant devices. Each assistant device can separately operate to exhibit a variety of different states, depending on an action being performed by each assistant device. In order to ensure that particular spoken utterances only affects intended target devices, each of the assistant devices can operate according to one or more dynamic regulations. A dynamic regulation can be a rule or instruction that can determine how a particular device will react to a particular spoken utterance, or request, given a certain context associated with the particular spoken utterance. A dynamic regulation can be modified over time according to changes in user preferences, changes in a number of devices within a location, and/or any other features that can influence an environment where a device is operable.

For instance, as provided in FIG. 1A, the location 138 can include a vehicle 114, which can have an assistant device 104 capable of assisting the user with controlling the vehicle 114. The location 138 can also include an assistant device 118, which can be a standalone assistant device capable of receiving touch and/or audio inputs, and providing audio and/or visual outputs. Additionally, the location 138 can include a television 128 which can allow a user 116 to access a television automated assistant 130 via an assistant interface 132 of the television 128.

Each of the television 128, assistant device 118, and the assistant device 104 can each include an automated assistant. For instance, the assistant device 104 can include a vehicle automated assistant 106, which can be accessed by the user 116 via an assistant interface 108. Furthermore, the assistant device 118 can include a client automated assistant 120, which can be accessed via an assistant interface 122. An assistant interface 122 can include one or more of a microphone, a speaker, a display panel, a touch display panel, a camera, a tactile interface such as a keyboard, and/or any other interface with which a user can control a computer device. In some implementations, the user 116 can control an automated assistant, and/or a device, using an assistant interface of another device. For example, each of the vehicle 114, the assistant device 118, and the television 128 can be connected at a common local network, such as a Wi-Fi network, thereby allowing data to be transmitted between two or more devices and/or applications via a network.

In some implementations discussed herein, each of the devices at the location 138 can operate according to one or more dynamic regulations of a set of dynamic regulations. A dynamic regulation can be provided in order to ensure that a device, at which the user intends an action to be performed, receives the instructions to perform the action, rather than the instructions inadvertently being executed at a different device. As one non-limiting example, the user 116 can be watching a movie with their friend via the television 128, which can be located in a living room of the location 138. While they are watching the movie, the assistant device 118 can be performing an active action of executing a timer. The timer can be, for example, intended for monitoring a status of food that the user 116 is baking in their oven. The actions being performed by both the television 128 and the assistant device 118 can be characterized by action data that is accessible and/or stored at each of the devices, or a server device that is in communications with each of the devices. When ongoing actions are initialized, performed, and/or completed at each perspective device, action data corresponding to each respective device can be updated to indicate an operating status of each device and/or one or more actions of each device.

According to the aforementioned example, when the timer has completed, the assistant device 118 can provide an output 142, such as emitting an alarm sound. In response to the timer completing, the action data 124 can be updated to indicate an operating status of the assistant device 118. For instance, the operating status can indicate that the assistant device 118 is "emitting alarm" and that an operating status of the timer is "timer complete." The action data 124 can identify one or more operating statuses 126 (e.g., STATUS (N) where N is any positive whole number).

Figure 1B:
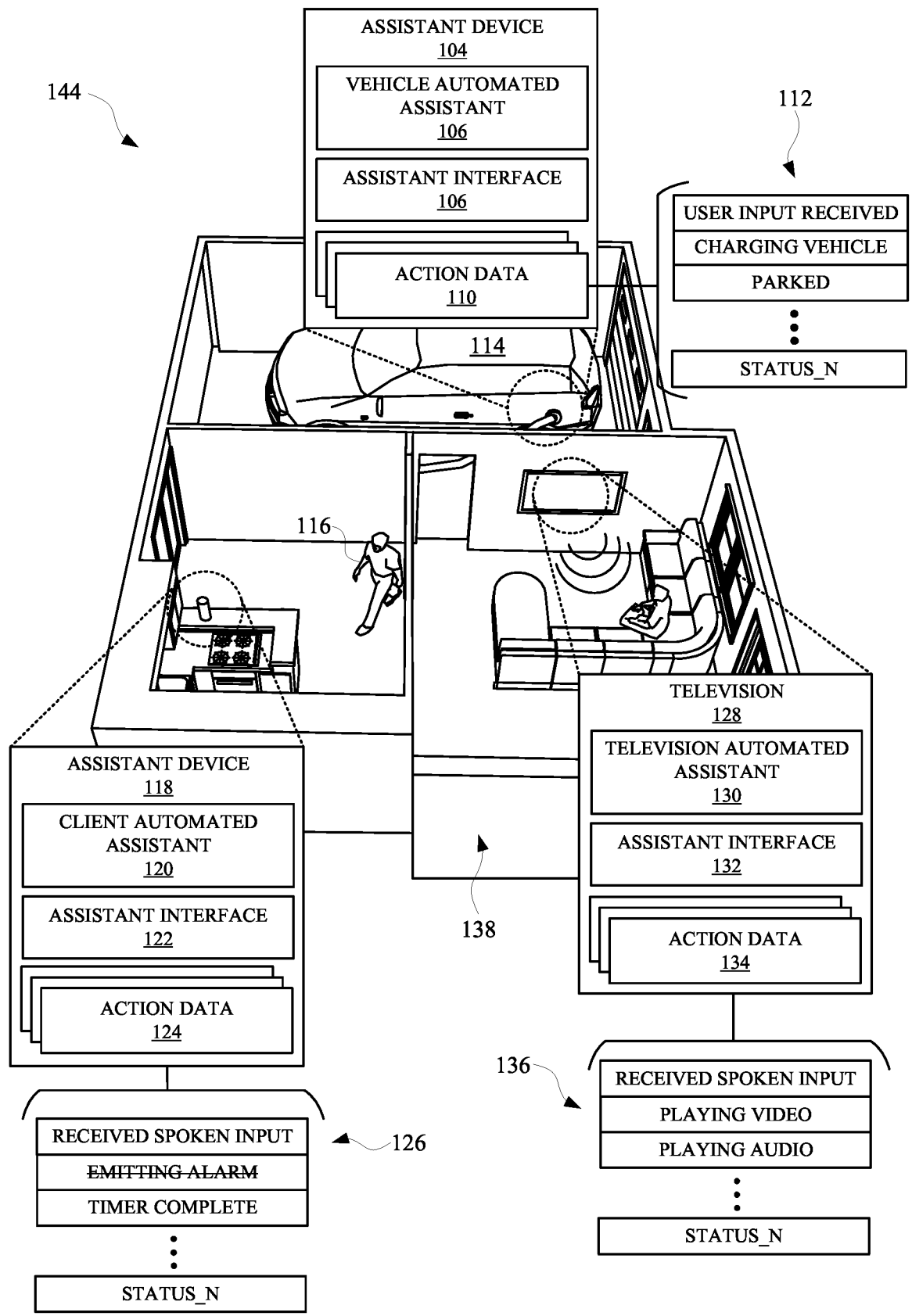
FIG. 1B illustrates a perspective view of how each device can respond to the spoken utterance provided by the user.

Because the user 116 is watching the movie when the alarm goes off, the user 116 may wish to stop the alarm without stopping any actions occurring at the television 128 (e.g., playing video and/or audio as indicated by statuses 136) and any actions occurring at the vehicle 114 (e.g., charging of the vehicle and remaining parked, as indicated by status information 112). For example, in furtherance of modifying an operating status of the assistant device 118, the user of 116 can provide the spoken utterance 140 "Assistant, stop." Each of the assistant devices can acknowledge the spoken utterance 140, as indicated in FIG. 1B. Specifically, FIG. 1B illustrates a perspective view 144 of how each device can respond to the spoken utterance 140 provided by the user 116. In response to acknowledging the spoken utterance, each automated assistant at each device can cause their respective status information to be updated to indicate the spoken utterance was received. For example, the assistant device 104 can update its status information 112 to indicate that user input was received. Similarly, the television 128 and the assistant device 118 can update their respected status information to indicate that a spoken input has been received. However, in order to ensure that no device will be inadvertently affected by the spoken utterance, each device can operate according to one or more dynamic regulations, and/or a set of dynamic regulations.

In some implementations, the dynamic regulations can be generated based on training data that, embodies habits of the user, and is generated with permission from the user 116. For instance, one or more dynamic regulations can be associated with contextual data that characterizes previous instances of user requests and/or device operating statuses that were apparent when previous user requests were provided. Therefore, contextual data collected by one or more assistant devices can be used in combination with one or more dynamic regulations to determine a targeted device, or multiple targeted devices, the user intends to interact with. For instance, the user may have previously provided the "Assistant, stop" spoken utterance when the assistant device 118 is emitting an alarm, the television 128 is playing video, and the vehicle 114 is charging. If an action other than emitting the alarm was stopped inadvertently in response to the spoken utterance "Assistant, stop," the user may have provided a corrective spoken utterance such as "No, stop the alarm." An automated assistant that receives the corrective spoken utterance can cause a dynamic regulation to be generated and/or updated in order to reflect the correction and/or a preference of the user. Specifically, the dynamic regulation can characterize the action the user 116 intended to perform (e.g., stopping an action), the operating statuses of devices in the location 138, and/or the device the user 116 intended to interact with (e.g., the assistant device 118).

In some implementations, a dynamic regulation can be based on contextual data that characterizes an occupancy of the location 138 and/or current operating statuses of one or more devices within the location 138. For example, the user 116 and their friend can be watching a movie at the television 128. During the movie, the user 116 can get up to check the status of something cooking in their kitchen. In order to ensure that the user 116 does not miss any of the movie, the friend can attempt to pause the movie by providing the spoken utterance, "Assistant, stop." Because the spoken utterance is ambiguous as to the action to be modified and/or the device to be affected, an automated assistant that has received the spoken utterance can access a dynamic regulation to determine how to respond to the spoken utterance. Specifically, the automated assistant can determine that the spoken utterance "Assistant, stop," corresponds to multiple different dynamic regulations. Additionally, the automated assistant can determine that a voice profile of the spoken utterance corresponds to a "guest" voice profile that is associated with one or more dynamic regulations of the multiple different dynamic regulations. The one or more dynamic regulations can be generated based on training data that characterizes a previous instance where the friend/guest provided the "Assistant, stop" spoken utterance. During the previous instance, the spoken utterance did not affect any of the devices, therefore, in response, the user 116 provided the corrective spoken utterance, "Assistant, pause the movie." Based on this previous context of friend requesting the automated assistant to "stop" something, no device responding, and the user 116 causing the movie to "pause," the automated assistant can cause a dynamic regulation to be updated or generated to reflect this preference of the user 116. Specifically, the preference can be characterized as giving permission to the friend, having the particular voice profile, to pause a movie playing at the television 128 when the user 116 and the friend are in the location 138.

In some implementations, when multiple devices acknowledge a spoken utterance from the user 116, a targeted device can be selected for responding to the spoken utterance based on a loudness tolerance generated in response to the spoken utterance. Specifically, a unique loudness tolerance can be generated that corresponds to a received spoken utterance. Each local automated assistant at the location 138 can arbitrate the formulation of the loudness tolerance in order to reduce a number of candidate targeted devices to those that heard the spoken utterance at a volume that is within the formulated loudness tolerance. For instance, in response to the assistant device 104, the assistant device 118, and the television 128 acknowledging the spoken utterance "Assistant, stop," each device can determine a volume that they heard the spoken utterance and communicate the determined volume to each of the other devices. Each device can then formulate a loudness threshold using each determined volume from each device. The loudness threshold can be generated by each device according to a function that is accessible to each of the devices.

Each particular device can compare that particular device's determined volume to the formulated loudness threshold to determine whether that particular device is a candidate target device. If the particular device is not a candidate target device, the particular device can communicate to the other devices that it is no longer a candidate target device. If only one device is left as a candidate target device once all the devices have compared their determined volume to the loudness threshold, that sole remaining device can be designated as the target computing device by the automated assistant. The target computing device can then be tasked with responding to the spoken utterance. However, if more than one candidate target device is left, one or more dynamic regulations can be employed, according to any implementation discussed herein, in order to break the "tie" between the candidate target devices.

Figure 2:
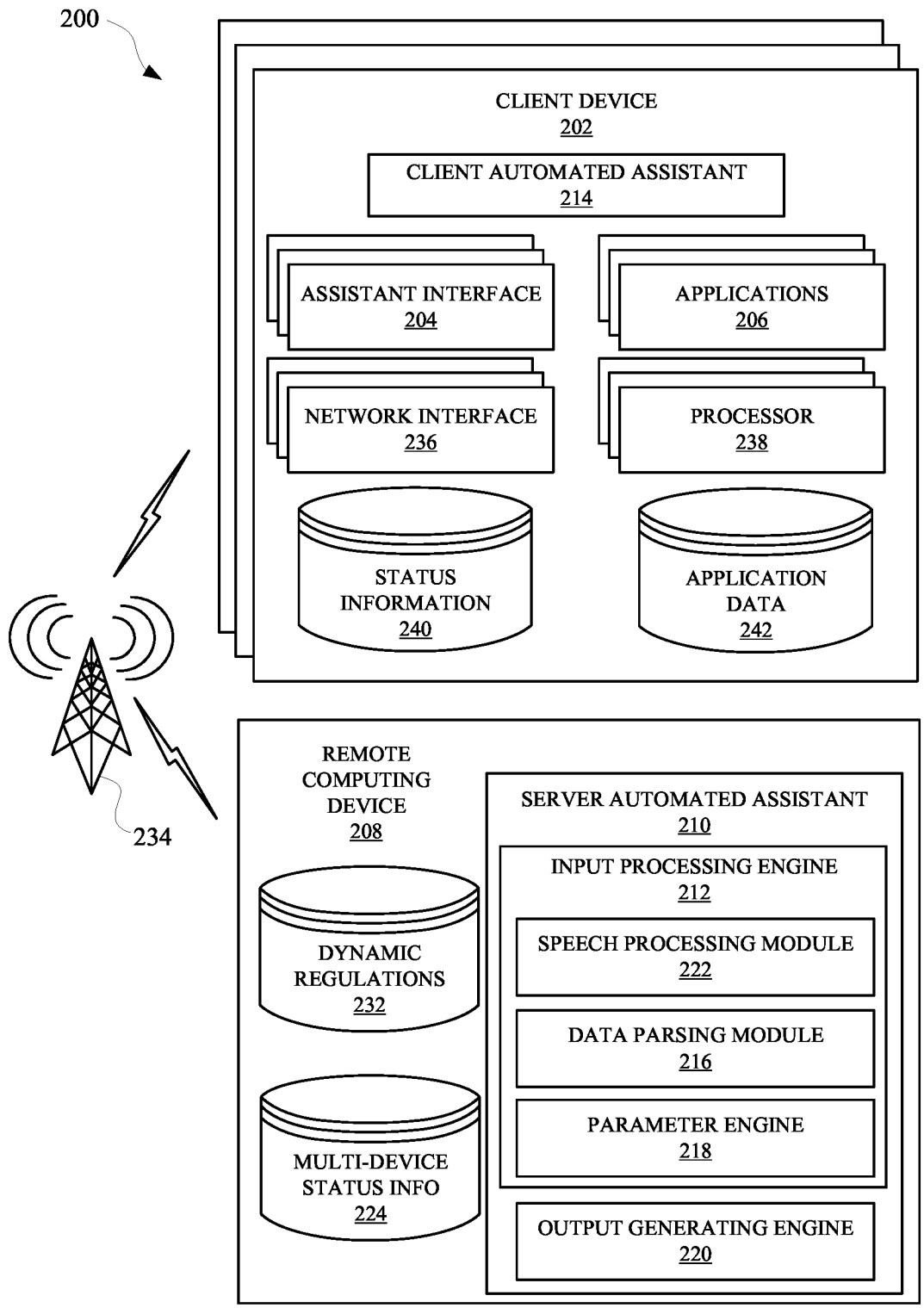
FIG. 2 illustrates a system for selecting a targeted device from multiple candidate devices for responding to a spoken utterance, in order to avoid inadvertently causing an unintended device to respond to the spoken utterance.

FIG. 2 illustrates a system 200 for selecting a targeted device from multiple candidate devices for responding to a spoken utterance, in order to avoid inadvertently causing an unintended device to respond to the spoken utterance. The client automated assistant 214 can operate as part of an assistant application that is provided at one or more computing devices, such as a client device 202 (e.g., a standalone speaker device, a display device, a personal computer, a portable computing device, a vehicle), and/or a remote computing device 208, such as a server device. A user can interact with the client automated assistant 214 via an assistant interface 204, which can be a microphone, a camera, a touch screen display, a user interface, and/or any other apparatus capable of providing an interface between a user and an application. For instance, a user can initialize the client automated assistant 214 by providing a verbal, textual, or a graphical input to the assistant interface to cause the client automated assistant 214 to perform a function (e.g., provide data, control a peripheral device, access an agent, initialize an action, stop an action, modify an action, etc.). The client device 202 can include a display device, which can be a display panel that includes a touch interface for receiving touch inputs and/or gestures for allowing a user to control applications 206 of the client device 202 via the touch interface. In some implementations, client device 202 can lack a display device, thereby providing an audible user interface output, without providing a graphical user interface output. Furthermore, the client device 202 can provide a user interface, such as a microphone, for receiving spoken natural language inputs from a user.

The client device 202 can be in communication with the remote computing device 208 over a network 234, such as the internet. The client device 202 can offload computational tasks to the remote computing device 208 in order to conserve computational resources at each of the client devices 202. For instance, the remote computing device 208 can host a server automated assistant 210, and the client device 202 can transmit inputs received at one or more assistant interfaces to the remote computing device 208. However, in some implementations, an automated assistant can be hosted at multiple different client devices. In various implementations, all or less than all aspects of an automated assistant can be implemented on multiple different client devices and/or a server device. In some of those implementations, aspects of an automated assistant are implemented via a local assistant application of the client device 202 and interface with the remote computing device 208 that implements other aspects of the automated assistant via a server automated assistant 210. The remote computing device 208 can optionally serve a plurality of users and their associated assistant applications via multiple threads. In implementations where all or less than all aspects of an automated assistant are implemented via a client automated assistant 214 of the client device 202, the client automated assistant 214 can be an application that is separate from an operating system of the client automated assistant 214 (e.g., installed "on top" of the operating system)—or can alternatively be implemented directly by the client device 202 (e.g., considered an application of, but integral with, the operating system).

In some implementations, the remote computing device 208 can include an input processing engine 212 that can process audio data received at an assistant interface to identify a request embodied in the audio data. The process for converting the audio data to text can be performed by a speech processing module 222, which can use a speech recognition algorithm, which can employ neural networks, word2vec algorithms, and/or statistical models for identifying groups of audio data corresponding to words or phrases. The text converted from the audio data can be parsed by a data parsing module 216 and made available to an automated assistant as textual data that can be used to generate and/or identify command phrases from the user and/or a third party application. Resulting data from the data parsing module 216 can be used by a parameter engine 218 to determine an action that the user is requesting be performed and/or one or more parameters that may still be needed to complete the action. In response to determining that one or more parameters are needed to complete one or more corresponding slots of a function, an output generating engine 220 of the server automated assistant 210 can generate a natural language output. The natural language output can be transmitted back to the client device 202 and provided to the user in order to ask the user to provide the additional parameters. For instance, the user can provide a spoken utterance of "Assistant, play a movie," which can correspond to an action of "playing media," which can require that the user identify the movie. The parameter engine 218 can determine that the movie was not identified, cause the output generating engine 220 to generate a natural language output (e.g., "What movie would you like to play?"), and cause the client device 202 to provide the natural language output.

In some implementations, in order to avoid inadvertently affecting the wrong client device in response to an assistant interface receiving a spoken utterance, each automated assistant can operate according to a set of one or more dynamic regulations 232. Each dynamic regulation 232 can be associated with one or more contextual features that can be used to identify a preference of a user for a particular device when the user provides a spoken utterance within a given context. In some implementations, prior to the user providing the spoken utterance, each client device 202 can provide status information 240 to the remote computing device 208. The status information 240 can indicate one or more actions being performed by each client device 202, such as, but not limited to, playing media, performing an update, operating in a sleep mode, operating in a wake mode, charging, downloading data, and/or any other action that can be performed by a computing device. The status information 240 can be generated by an automated assistant, which can access application data 242 that identifies one or more actions being performed by the applications 206 and/or the automated assistant. In some implementations, the status information 240 can identify actions previously performed at the client device 202, actions expected to be performed by the client device 202, and/or actions that have been performed, are currently being performed, and/or are expected to be performed by a remote device that is in communications with the client device 202.

The remote computing device 208 can pre-process any multi-device status info 224 (i.e., status information corresponding to multiple client devices) prior to one or more client devices receiving a spoken utterance. In this way, the remote computing device 208 can delegate any actions corresponding to the spoken utterance with minimal or no latency. In some implementations, a particular client device 202 can be delegated to perform a particular action, even before a spoken utterance has been completely received by a receiving client device, at least based on the processing of the multi-device status info 224.

In some implementations, when a spoken utterance is received at a client device 202, at least a portion of the spoken utterance can wake the client device 202 (e.g., "Assistant, . . . ) and a remaining portion can be converted to audio data and transmitted to the remote computing device 208 for further processing. The input processing engine 212 can determine, using the audio data, whether the spoken utterance is an ambiguous query or a specific query. An ambiguous query can be one that does not specify a particular device and/or does not specify a particular action to initialize, modify, and/or interrupt. For instance, the spoken utterance "Assistant, stop," can be considered an ambiguous spoken utterance because it does not specify a particular device or a particular action to modify, such as "playing the music." A specific query is a spoken utterance that does identify the device at which a request embodied by the spoken utterance should be fulfilled. When the spoken utterance is classified as a specific request, the device identified by the spoken utterance can be tasked with fulfilling the specific request. However, when the spoken utterance is classified as an ambiguous request, the dynamic regulations 232 and/or the multi-device status info 224 can be used to determine a targeted client device that the user intended to invoke.

For example, a dynamic regulation of the dynamic regulations 232 can indicate operations to perform when a particular user provides an ambiguous spoken utterance of "Assistant, stop." Specifically, the dynamic regulation can indicate that when the multi-device status info 224 indicates that media is playing from a television and an alarm is going off at a separate assistant device, the ambiguous spoken utterance should cause the alarm to stop. Additionally, or alternatively, another dynamic regulation of the dynamic regulations 232 can indicate what to do when a voice signature of a child is detected when an ambiguous spoken utterance of "Assistant, play a movie" is provided. Specifically, the other dynamic regulation can indicate that when the multi-device status info 224 indicates that, when a movie is already playing at a living room television, and a child is requesting a movie to be played, the ambiguous spoken utterance should cause a movie to start playing in a bedroom (e.g., a child's bedroom). In this way, the ambiguous request from the child would not interrupt a movie that is already playing in the living room. This can preserve computational resources at the living room television, as the living room television would not inadvertently lose any cached data devoted to the current movie being played, or consume network bandwidth inadvertently downloading the movie requested by the child.

The dynamic regulations 232 can be generated at the remote computing device 208 and/or at each client device 202 that is in communication with the remote computing device 208. The dynamic regulations 232 can be considered "dynamic" because they can be modified and/or newly generated according to preferences and/or habits of each user that engages with the automated assistant. For instance, a preference of a user can be determined when a user provides a corrective spoken utterance, in response to the automated assistant causing an unintended action to be performed in response to an initial spoken utterance. The initial spoken utterance can be, for example, "Assistant, turn down," which can be provided by a user when the user is participating in a phone conversation on their cell phone while listening to music on their assistant device. The unintended action can be the automated assistant causing audio from the phone call to be decreased in volume.

When the user provides a corrective spoken utterance such as, "No, turn down the music," the automated assistant can return the audio from the phone call to its original setting and cause the volume of the music to turn down. Additionally, in response to receiving the spoken utterance, the automated assistant can cause a new or modified dynamic regulation to be generated and accessible to the automated assistant. The dynamic regulation can indicate that when the user is participating in a phone call on their cell phone while music is playing from the assistant device, and the user provides the request "turn down," the music should be turned down rather than the phone call. This dynamic regulation can be dependent upon current status information 240 at the cellular phone and at the assistant device, which would indicate that a phone call is occurring and music is playing, simultaneously. Therefore, if the user provides the spoken utterance, "Assistant, turn down," when those particular ongoing actions are not occurring simultaneously (thereby indicating a different context), the dynamic regulations 232 may influence the automated assistant to do something different.

In some implementations, the dynamic regulations 232 can be embodied as one or more tables that can be accessible to one or more automated assistants. The table can include a column that identifies requests and/or actions, and a row that identifies operating statuses of particular devices. A value corresponding to respective row and a respective column can indicate a score, which can be used to identify a device that the request should influence. For instance a request to "stop" can be identified in a row, a first column can identify an alarm being emitted at an assistant device, and a second column can indicate that a movie is playing at a television. Depending on a particular user to which the table corresponds, the table can provide a higher score or comparably more valuable metric at the first column than the second column, thereby causing the assistant device to be affected over the television, when the user provides the "stop" request under the corresponding context.

In some implementations, one or more dynamic regulations can be based on one or more machine learning models. A machine learning model can operate to receive as input, contextual data associated with a particular spoken utterance and/or one or more client devices, and provide, as output, an indication of a device and/or action that should effect a response to the spoken utterance. The machine learning model can be trained using training data that characterizes previous instances in which the user provided a corrective spoken utterance. Additionally, or alternatively, the machine learning model can be trained using training data that characterizes previous instances in which an action was performed in a given context, without a corrective spoken utterance being subsequently received.

Figure 3A:
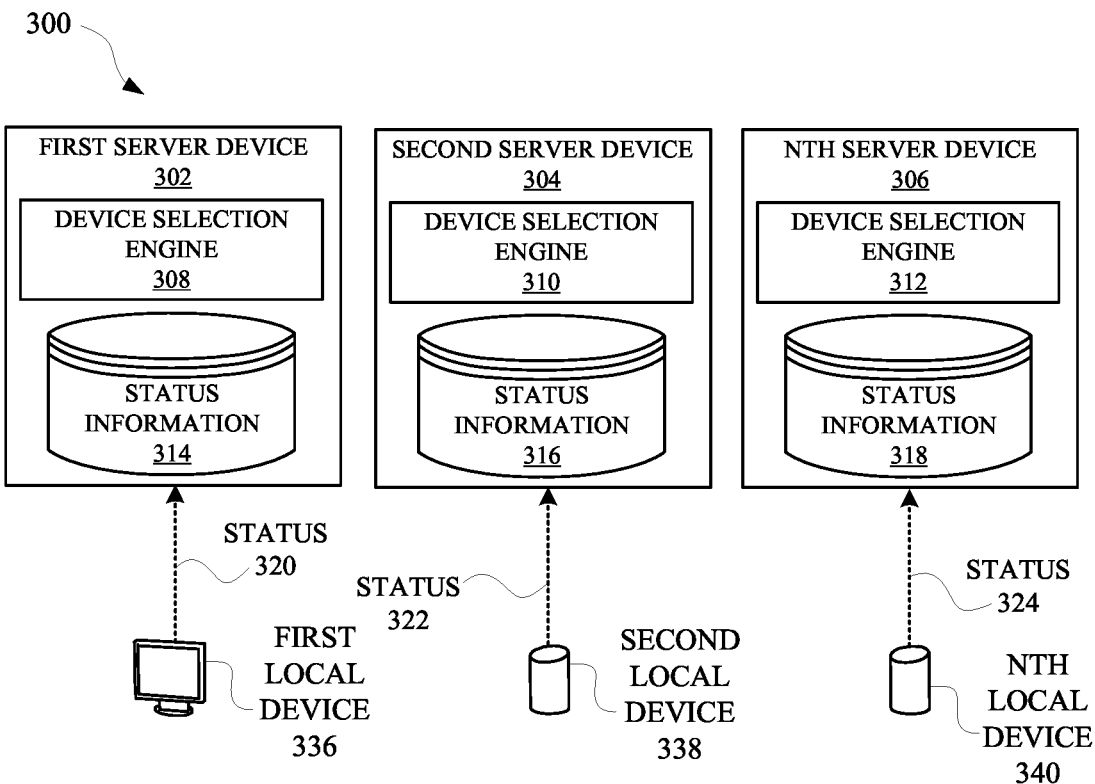
Figure 3B:
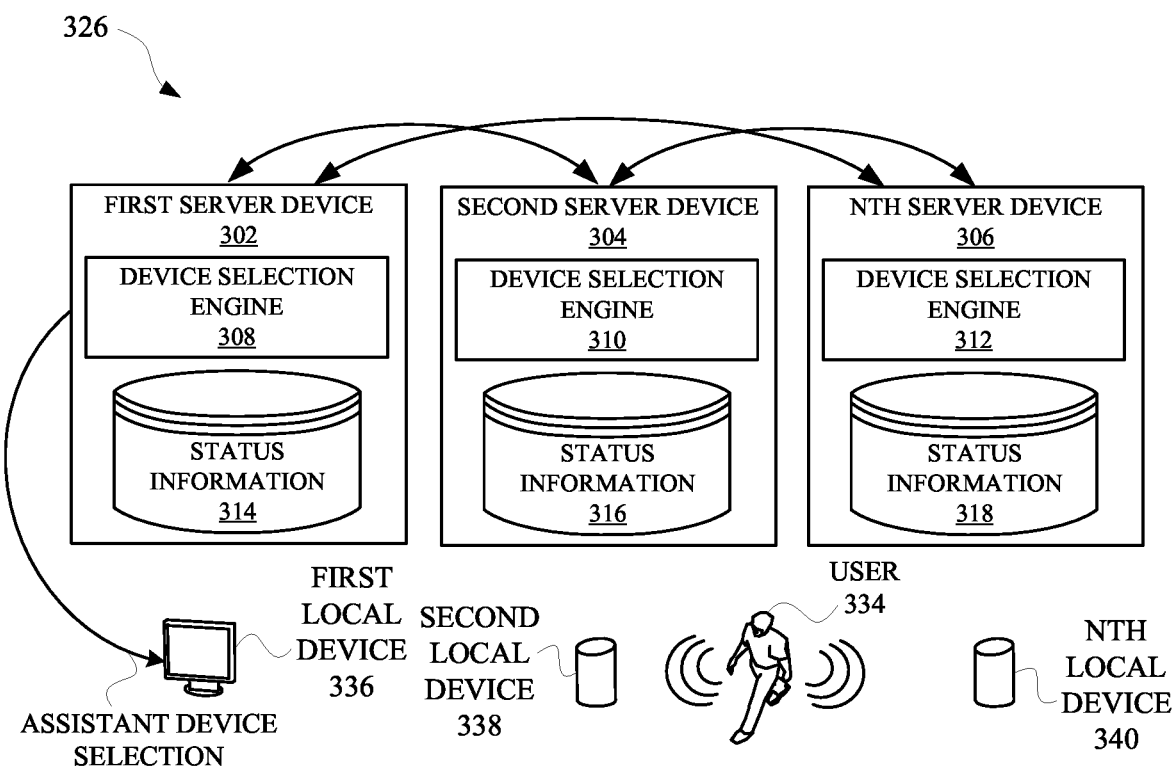

FIG. 3A and FIG. 3B illustrate system diagrams for selecting a server that will determine a targeted client device at which a particular spoken utterance will be responded to. Specifically, FIG. 3A illustrates a system 300 for arbitrating decisions for selecting particular local devices to respond to particular spoken utterances provided by one or more users and acknowledged by one or more local devices. Prior to acknowledging a spoken utterance, and/or in response to receiving a spoken utterance, each of a first local device 336, a second local device 338, and a Nth local device 340 can provide status information to a respective server device. Status 320 can be provided to a first server device 302, status 322 can be provided to a second server device 304, and status 324 can be provided to an Nth server device 306, where "N" is any positive integer. Each server device can store status information 314, status information 316, and status information 318, respectively, and use the stored status information to designate a particular local device for responding to a particular spoken utterance.

In some implementations, each of the local devices can be disposed about a location (e.g., a home of the user) and one or more of the local devices can be associated with one or more different accounts than other local devices. As a result, the local devices within the location may communicate with different server devices. The server devices can arbitrate a selection of a particular local device to respond to particular spoken utterances within a given context and/or according to the statuses provided to the server devices. In this way, latency, between providing a spoken utterance and receiving a response from a particular local device, can be mitigated.

FIG. 3B illustrates a system diagram 326 of each server device sharing status information related to a particular local device that provided status information. Specifically, the first server device 302 can share a status information about the first local device 336 with the second server device 304 and the Nth server device 306. The second server device 304 can share status information with the first server device 302 and the Nth server device 306, and the Nth server device 306 can share status information with the first server device 302 and the second server device 304. The server devices can be aware that they are in communication with local devices within the same location and/or connected to a common network, thereby enabling each server device to provide other server devices with status information. In some implementations, a client device can send status information about another client device that is connected to the client device. In this way, the client device can transmit status information of other devices that may not be equipped to send status information over a network to a server device, but can otherwise connect to a client device and/or share data with a client device. Each server device can then predict particular spoken utterances and/or requests that may be received by a particular user while all the local devices are operating according to their status information. For instance, each server device can predict that, when a movie is playing at the first local device 336 and a phone call is currently ongoing at the second local device 338, a user 334 may provide a spoken utterance such as "Assistant, pause." Each server device can also determine which device the user 334 intends to affect when they provide the spoken utterance "Assistant, pause," given the aforementioned context.

Each server device can include a respective device selection engine 308, 310, or 312, for determining which device the user intends to affect according to received status information 240. In some implementations, a device selection engine can determine: a targeted local device based on a location of the user relative to one or more local devices, voice characteristics of the user, occupancy data associated with the location, operating statuses of one or more local devices within the location, a proximity of one or more trusted devices (e.g., a watch, cell phone, etc.) to a particular local device, an operating status of one or more applications operating at a local device, and/or any other information that can be associated with a local device. If one or more of the server devices determines that the first local device 336 should be responsive to the spoken utterance, the first server device 302, which received the status 320 from the first local device 336, can be assigned to process any spoken utterance received during the current context. In some implementations, the first server device 302 can be assigned to only process ambiguous requests, and any specific requests can be processed at whichever server device corresponds to the local device that the user 334 specified.

For instance, when the user provides the spoken utterance "Assistant, pause," while the movie is playing at the first local device 336 and a phone call is ongoing at the second local device 338, the spoken utterance can be acknowledged by multiple local devices. However, because the server devices have already arbitrated the decision of which local device and/or which server device will handle ambiguous requests, the spoken utterance will ultimately be processed by the first server device 302, and the first local device 336 will provide a response to the spoken utterance (e.g., "Ok, I will pause the movie.").

In some implementations, a tie may occur when a particular server device is attempting to narrow down a choice of a local device to respond to the spoken utterance. A tie can be resolved based on device names established by the user for each of the local devices and/or one or more remaining devices to be selected from. For example, if there is a tie between two local devices for responding to a particular spoken utterance, and one of the two local devices has a user-created name that includes the word "favorite," that one local device can be selected over the other for responding to the particular spoken utterance. Additionally, or alternatively, a tie can be resolved according to user habits that indicate the user has historically preferred one of the local devices involved in the tie for performing the request corresponding to the tie. Therefore, this identified preference can "tip" the balance of the tie in favor of the preferred device. Additionally, or alternatively, a tie between multiple local devices can be resolved by comparing features of the multiple local devices to identify the local device that is most suitable or equipped for responding to the spoken utterance that caused the tie. For instance, if the user has asked that music play (e.g., "Assistant, play music."), and a server device has narrowed the selection of a local device to play the music to two standalone speaker devices, the server device can select the local device that is most suitable for playing music. Specifically, the server device can select the local device that has the most speakers, is in a portion of the home of the user that has better acoustics, and/or has more network and/or processing bandwidth available for streaming music.

Additionally, or alternatively, a tie between two local devices can be based on a loudness of a spoken utterance as determined by each of the two local devices. Therefore, if one local device of the two local devices heard the user at a louder volume than the other local device of the two local devices, the local device that heard the user the loudest can be selected. It should be noted that any information used to resolve a tie can be provided to the server device for resolving the tie. For instance, in response to multiple local devices acknowledging a spoken utterance, each of the local devices can determine a loudness measurement (e.g., in decibels) that local device heard the user and provide the loudness measurement to the server device, for purposes of allowing the server device to resolve a potential tie. Similarly, in implementations where arbitration or selection of a local device to respond to a spoken utterance is performed locally, information for resolving a tie can be shared by each local device with other local devices, or at least those local devices that are the subject of the tie. In some implementations, an intentional delay can be programmed into the process for resolving a tie in order to ensure that all tie-breaking info has been received at one or more server devices, or one or more local devices, depending on where the tie is being resolved.

Figure 4A:
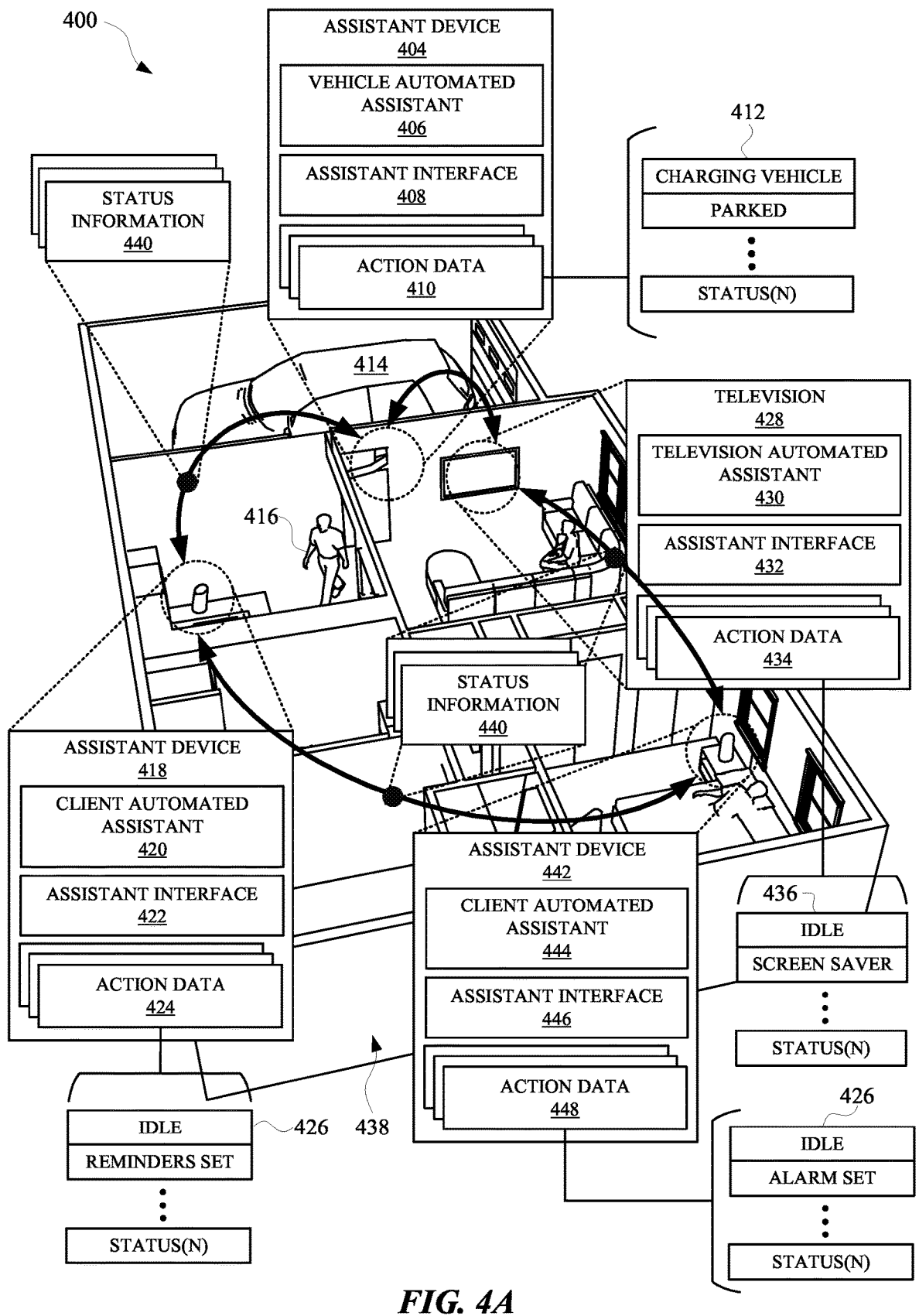
FIG. 4A and FIG. 4B illustrate implementations that allow arbitration, of a selection of a client device to respond to a spoken utterance from a user, to be performed locally.
Figure 4B:
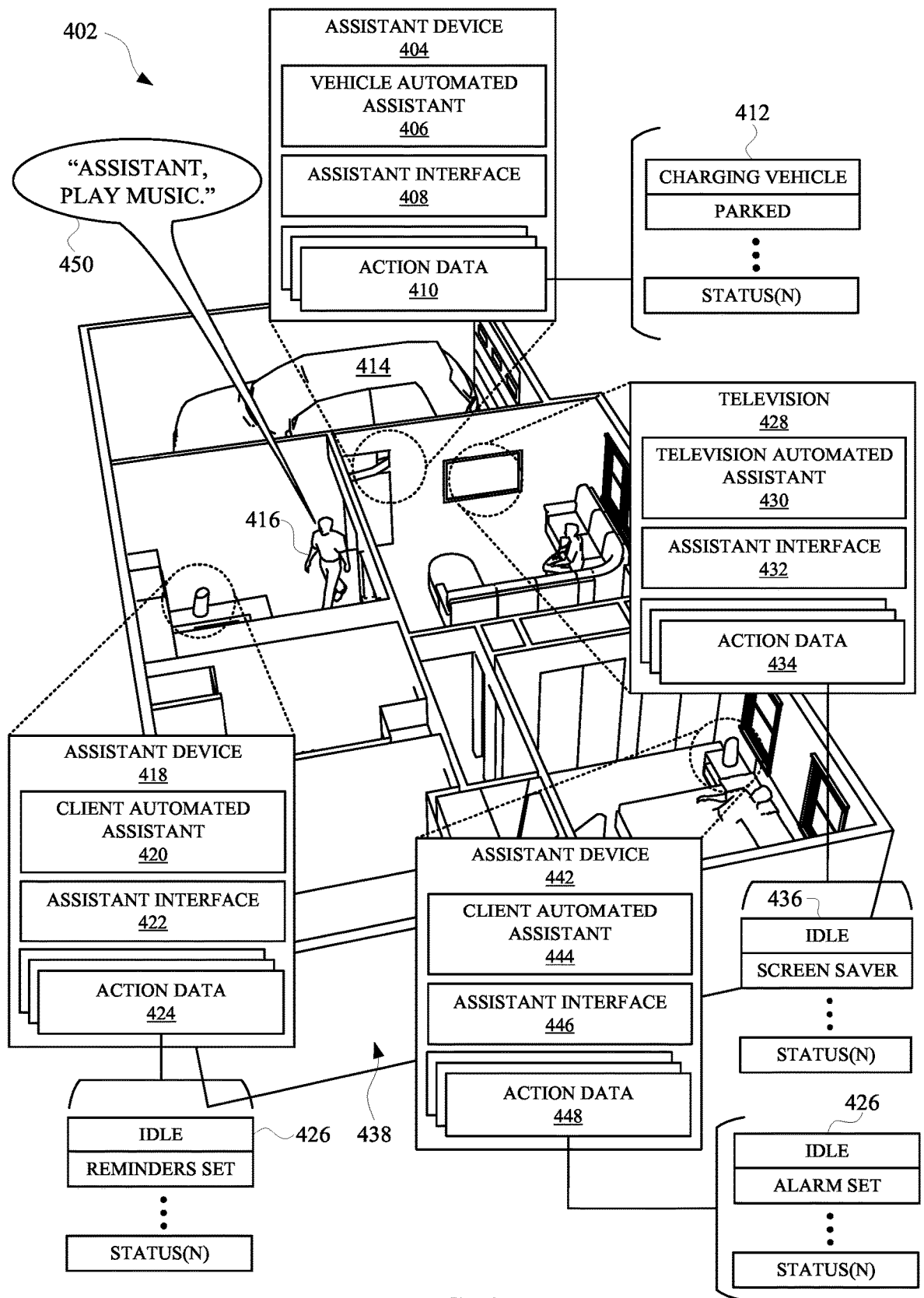

FIG. 4A and FIG. 4B illustrate implementations that allow arbitration, of a selection of a client device to respond to a spoken utterance from a user, to be performed locally. In some implementations, arbitration of the selection of a targeted client device can be based on a location of a user relative to other client devices within a particular location 438. Additionally, or alternatively, arbitration of the selection of a targeted client device can be based on the user that is providing the spoken utterance. Arbitration can at least partially take place prior to receipt of a spoken utterance by one or more client devices, in order to mitigate an amount of latency that might otherwise be exhibited between, when the user finishes providing the spoken utterance, and a particular client device responding to the spoken utterance.

For example, prior to a user 416 providing a spoken utterance, each client device within the location 438 can share its respective status information 440 (and optionally status information corresponding to one or more devices connected to a respective client device) with other client devices in the location 438. The status information 440 can characterize operating statuses of one or more devices and/or one or more applications. For instance, status information 440 from a vehicle 414 can characterize operating statuses 412, which can include "charging vehicle" and being "parked." Additionally, status information 440 from an assistant device 418 can characterize operating statuses 426, which can include remaining "idle" and tracking "reminders set" by the user 416. Additionally, an assistant device 442 can provide status information 440 that characterizes operating statuses 426 of remaining "idle" and tracking an "alarm set" by another user, and a television 428 can provide status information 440 that characterizes operating statuses 436 of remaining "idle" and providing a "screen saver."

Each client device (i.e., the vehicle 414, the assistant device 418, the assistant device 442, the television 428) can determine a score or metric based on any received status information 440, in order to arbitrate a selection of a targeted client device when a spoken utterance is received by one or more of the client devices. Additionally, or alternatively, contextual data can be individually generated by each client device in order to characterize a relative context in which a spoken utterance was provided. For instance, in response to at least one client device receiving a spoken utterance, a client device can communicate to the other client devices, via a local network (e.g., a Wi-Fi network), that a spoken utterance was provided by a user. Each of the other client devices can determine a volume (e.g., in decibels) at which each client device heard the spoken utterance. Each individual volume can be used in combination with the status information to determine a respective score for each client device, or a rank of each client device relative to rankings of multiple client devices. Each score or rank determined by each client device can be transmitted to all other client devices on the network, in order that each client device can determine whether their score corresponds to the highest score. The client device corresponding to the highest score can then be designated as the "target" client device, and respond accordingly to the spoken utterance. In some implementations, the target client device can transmit data to the other non-target client devices, indicating that it is the designated target client device over the other non-target client devices. In response to each client device determining that they are not the designated target client device, each client device can exit a wake mode, suspend the activity of their microphones, and/or otherwise reduce an amount of sampling or processing that had been increased in response to receiving the spoken utterance.

In some implementations, if data corresponding to a particular spoken utterance is received by a client device prior to that client device receiving the spoken utterance, the client device can designate itself as not being targeted, and optionally delete the received data. Additionally, or alternatively, if data corresponding to a particular spoken utterance is received at a client device within, or outside of, a threshold time period (e.g., 100 ms, 1 s, and/or any other suitable time period) of the spoken utterance arriving at the client device, that client device can designate itself as a candidate target client device or designate itself as not being targeted. In this way, each device can drop out from being considered a candidate target device in order to preserve computational resources and network bandwidth, which would otherwise be consumed arbitrating the selection of the target client device among a larger pool of client devices. If a particular device remains a candidate target device after receiving the data, the particular device can determine its own score, compare it to other scores received from other client devices, optionally determine whether a tie has occurred and identify information for resolving the tie, and then drop out or designate itself as the targeted computing device. In some implementations, the "data" transmitted can include a score, contextual data associated with the sender client device, a tier of the sender client device relative to other client devices, and/or any other information that can be used when arbitrating a selection of a client device.

In some implementations, if upon waking up in response to receiving a spoken utterance, a particular client device (e.g., the assistant device 418) does not receive data from the other client devices (i.e., the vehicle 414, the assistant device 418, the assistant device 442, the television 428) regarding the spoken utterance, the particular client device can designate itself as the target client device for responding to the spoken utterance. Optionally, the particular client device can also send, to the other client devices, data that characterizes tie-breaking information that could be used by another client device, in case one of the other client devices also designates themselves as a target client device, thereby creating a tie. In some implementations, a client device can send other client devices data corresponding to contextual data that is based on traits and/or operating parameters of a remote client device that is in communication with the client device. The client device can designate the remote client device as the target client device when the client device determines that a score or rank of the remote client device is distinguished from other scores or other ranks of other client devices. In other words, a client device can determine a score or rank for itself and any other device that is in communication with the client device, even if the other device is not in communication with any other client device that is a candidate for responding to the spoken utterance. It should be noted that the remote client device can be an apparatus that connected to a client device, such as a Bluetooth enabled device, a display panel, a standalone speaker device, a peripheral device, and/or any other apparatus capable of connecting with a computer (e.g., a client device).

In some implementations, status information 440 provided from each client device can include information that characterizes a distance of the user from a respective client device. The distance can be determined using one or more sensors accessible to each client device, with permission from the user 416. Additionally, or alternatively, the distance can be determined using voice characteristics of the spoken utterance, compared to a stored topology that indicates adjacency of rooms and/or locations of devices within the location 438. In some implementations, the distance can be based on a determined location of a trusted device, that is typically carried by the user 416 and can therefore be "trusted" to provide a location of the user 416, with permission from the user 416. For instance, a television automated assistant 430 can determine that a smart watch worn by the user 416 is 10 feet away, and embody that distance measurement in the status information 440 that is provided to the other client devices. In some implementations, each device can determine their respective score at least partially based on a comparison of their respective distance from the user relative to other distances of other client devices relative to the user 416. In this way, a respective client device that is located outside or inside of a threshold distance from one or more of the client devices and/or the user 416 can designate itself as not being targeted, or being targeted, respectively.

In some implementations, arbitration of a selection of a targeted client device to respond to a particular spoken utterance can be agnostic as to the request being made and/or the action that a user intends a client device to perform. Additionally, or alternatively, the arbitration of a selection of a targeted client device can be volume-agnostic, and therefore can be based on information that does not include a volume at which a client device heard the user. Additionally, or alternatively, the arbitration of a selection of a targeted client device can be based on a volume at which at least one client device heard the user, and at least one volume-agnostic characteristic of a context in which the spoken utterance has been provided. In some implementations, in order to ensure that a client device only responds to a user rather than another client device, an input processing engine of a client device can be equipped with a voice recognition feature that allows the client device to not react when other client devices are responding to spoken utterance.

In some implementations, when each client device has shared their respective status information 440 (as illustrated in diagram 400), a user 416 can subsequently provide a spoken utterance 450 (as illustrated in diagram 402). Arbitration of a selection of the targeted client device, which will respond to the spoken utterance, can be performed prior to, during, or after the receipt of the spoken utterance. For instance, the arbitration can result in the assistant device 442 having a smallest score because of a time of day (e.g., past 10 PM), and the operating status 426 for the assistant device 442 indicates that the assistant device 442 is idle and has an alarm set. Therefore, the assistant device 442 can presume that the assistant device 442 should not have a highest score for responding to any spoken utterances because someone may be sleeping in a room in which the assistant device 442 is located. For instance, should a user 416 provide the spoken utterance 450 of "Assistant, play music," the assistant device 442 will be ranked last according to any local arbitration, as a result of the status information that was shared between the local client devices.

In some implementations, one or more machine learning models can be employed by one or more of the client devices in order to determine a score for each respective client device, and/or otherwise determine a targeted client device that will respond to the spoken utterance. A machine learning model used by a client device to determine a score can use previous instances of status information 440 provided by one or more other client devices as training data. Status information 440 provided by other client devices after some amount of training can be used as an input to a machine learning model, and/or a function resulting from a machine learning model, in order to identify a targeted client device, and/or a score for a respective client device. Other contextual data can also be provided as input to the machine learning model such as, but not limited to, voice characteristics of one or more users, occupancy data associated with the location 438, room adjacency data corresponding to the location 438, a current time, a current date, previous actions performed by one or more client devices, one or more actions expected to be performed at one or more client devices, a stored calendar accessible to a client device, a location of other remote devices relative to a client device, and/or any other information that can be suitable for providing as an input to a machine learning model.

Figure 5A:
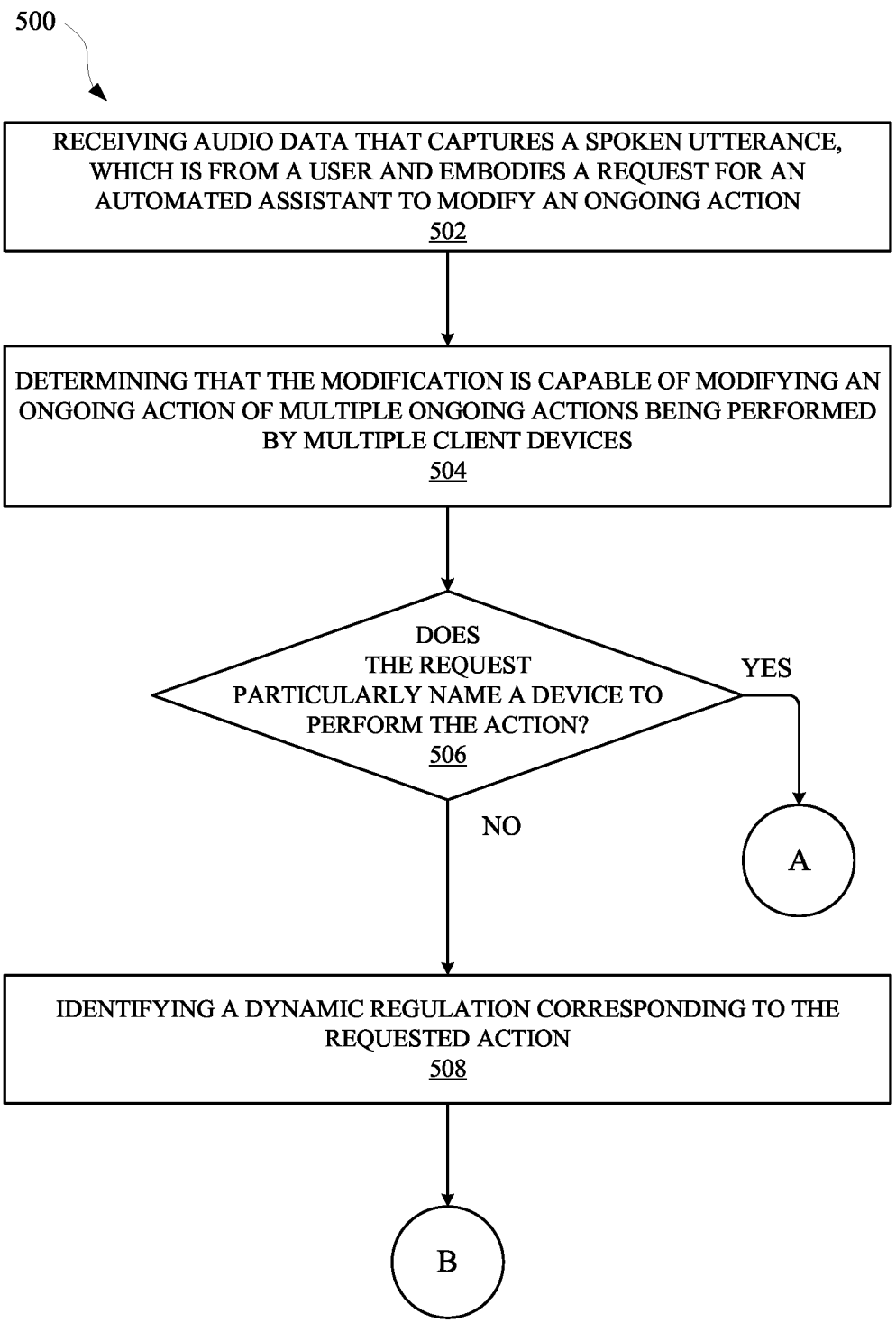
FIGS. 5A and 5B illustrate methods for modifying an ongoing action, being performed by a client device, in response to a spoken utterance that was received at multiple client devices.
Figure 5B:
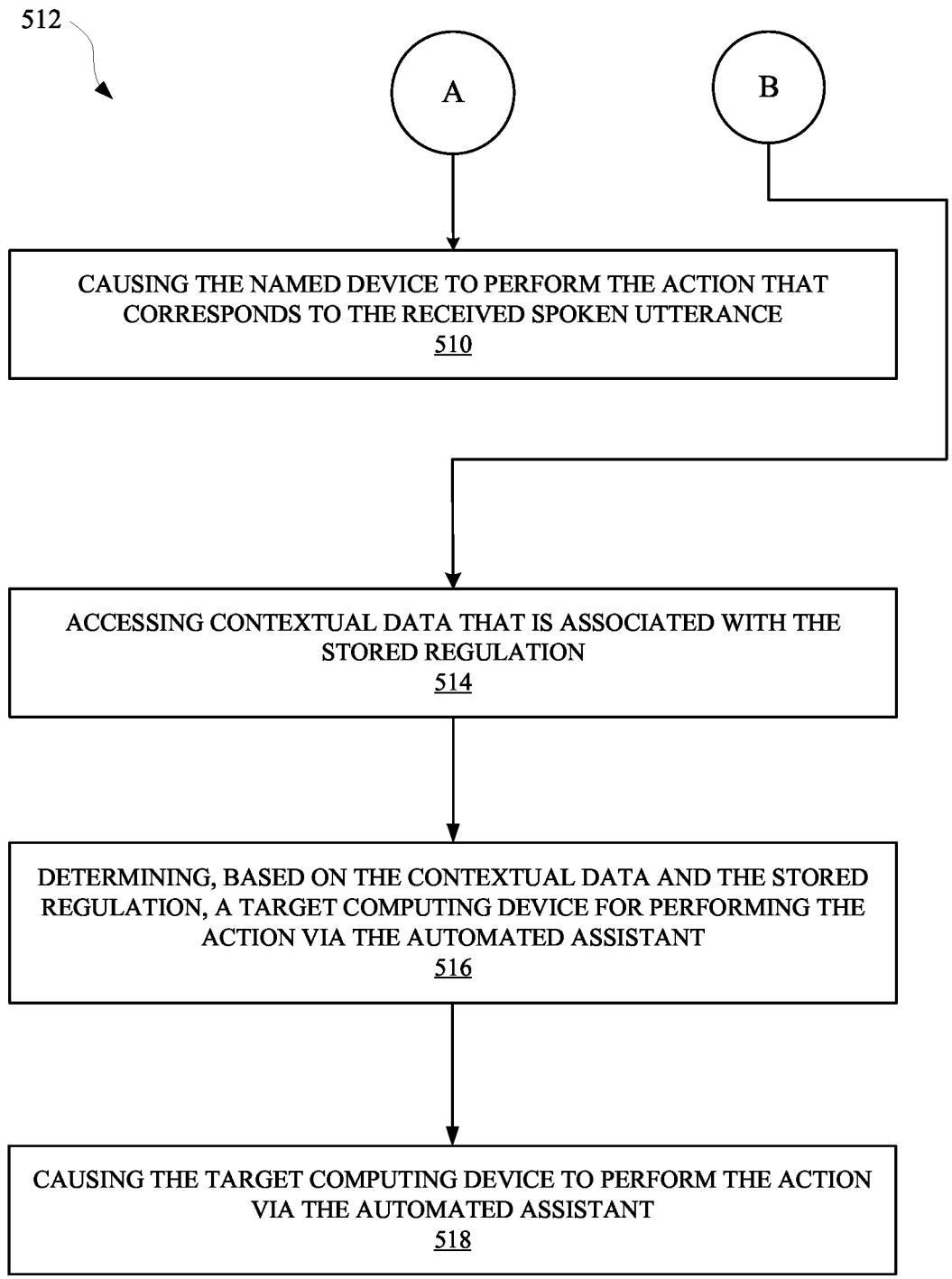

FIGS. 5A and 5B illustrate method 500 and method 512 for modifying an ongoing action, being performed by a client device, in response to a spoken utterance that was received at multiple client devices. The method 500 and the method 512 can be performed by one or more computing devices, server devices, applications, and/or any other apparatus or module capable of interacting with an automated assistant. The method 500 can continue to the method 512 via continuation elements "A" and "B," each encircled in FIG. 5A and FIG. 5B. The method 500 can include an operation 502 of receiving audio data that captures a spoken utterance, which is from a user and embodies a request for an automated assistant to perform an action. For instance, the spoken utterance can be, "Assistant, stop," and the spoken utterance can be heard by multiple client devices within a home of the user. The user may intend the spoken utterance to affect only a single action, therefore a process must be used to identify the particular client device and/or action that the user intends to affect. The process can be performed at one or more server devices, and/or one or more client devices.

The method 500 can further include an operation 504 of determining that a modification, requested by the user via the spoken utterance, is capable of modifying an ongoing action of multiple ongoing actions being performed by the multiple client devices. Specifically, the audio data can be converted into text, which is then parsed to identify a portion of the text that corresponds to a request. For instance, an invocation phrase portion of the spoken utterance can be "Assistant" and the request portion of the spoken utterance can be "stop." The invocation phrase portion can cause the multiple client devices to modify an operating state of their respective microphones to be in a wake state, in order to capture audio data corresponding to a remaining portion of the spoken utterance. When the request portion of the spoken utterance has been identified, a determination can be made as to whether the request corresponds to a request to modify an ongoing action.

The method 500 can further include an operation 506 of determining whether the request particularly named a device to perform the request and/or the action. In other words, the operation 506 can include determining whether a request is specific or ambiguous, as to the action to be modified or the device that will perform the modification to the action. If the request is specific as to the action to be modified and/or the device that will perform the action modification, the method 500 can proceed from method 500 at operation 506 to method 512 at operation 510, via continuation element "A." If the request is ambiguous as to the action to be modified and/or the device that will perform the action, the method 500 can proceed to operation 508.

The operation 508 can include identifying a stored regulation that corresponds to the modification for the ongoing action. The stored regulation can be identified at least based on the text that was parsed from the audio data for identifying the request. One or more regulations can be associated with the request, and each regulation can be generated according to learned preferences of one or more users. For instance, the identified regulation can identify the aforementioned request "stop," and indicate one or more actions that should be affected by the request depending on available contextual data. For instance, the contextual data can indicate operating statuses of one or more device within a location in which the user provided the request "stop," and the regulation can direct the automated assistant can cause a particular action to be modified based on those particular operating statuses.

The method 500 can proceed from operation 508 to operation 514, as indicated by continuation element "B." The operation 514 can include accessing contextual data that is associated with the stored regulation. The contextual data can identify and/or characterize: types of devices in the home where the spoken utterance was provided, traits and/or functional capabilities of the devices in the home, devices that have a transient existence within the home or are otherwise tend to follow the user (e.g., a watch, a cellphone, etc.), operating states of one or more devices in the home or other devices connected to the devices in the home, media being accessed by one or more devices, actions being performed by one or more devices (e.g., a phone call, a timer counting down), future operating states of one or more devices, expected or predicted operating states of one or more devices, how long one or more devices have been in each of their respective operating states, how long one or more devices are expected or predicted to be in each of their respective operating states, and/or any other property or feature that can be associated with an apparatus or application. For example, the contextual data can indicate that the home of the user includes an assistant device that is emitting an alarm, a television that is playing a movie, and a cell phone that is receiving a phone call.

The method 512 can further include an operation 516 of determining, based on the contextual data and the stored regulation, a target computing device for performing the action via the automated assistant. For instance, the stored regulation can indicate that when the user provides an ambiguous spoken utterance that includes a "stop" request, and an alarm is being emitted by any device, the alarm action should be stopped at the acting device. In this way, despite a non-alarm emitting device hearing the ambiguous request from the user louder than any other device in the home, the ambiguous request will only affect the alarm-emitting device. In this way, this respective stored regulation can include at least one volume-agnostic condition for modifying an ongoing action.

The method 512 can also include an operation 518 of causing the target computing device to perform the action (or modify an ongoing action) via the automated assistant (or not via the automated assistant). For instance, in response to comparing the contextual data with the identified stored regulation, an automated assistant can determine that the alarm being emitted by one or more devices is the targeted action to be modified according to the request from the user. The automated assistant can then identify a targeted one or more devices based on which devices are emitting an alarm. If there is only a single alarm being emitted at a single device, the automated assistant can designate that single device as the targeted device, and cause the alarm to be stopped according to the request from the user.

Figure 6:
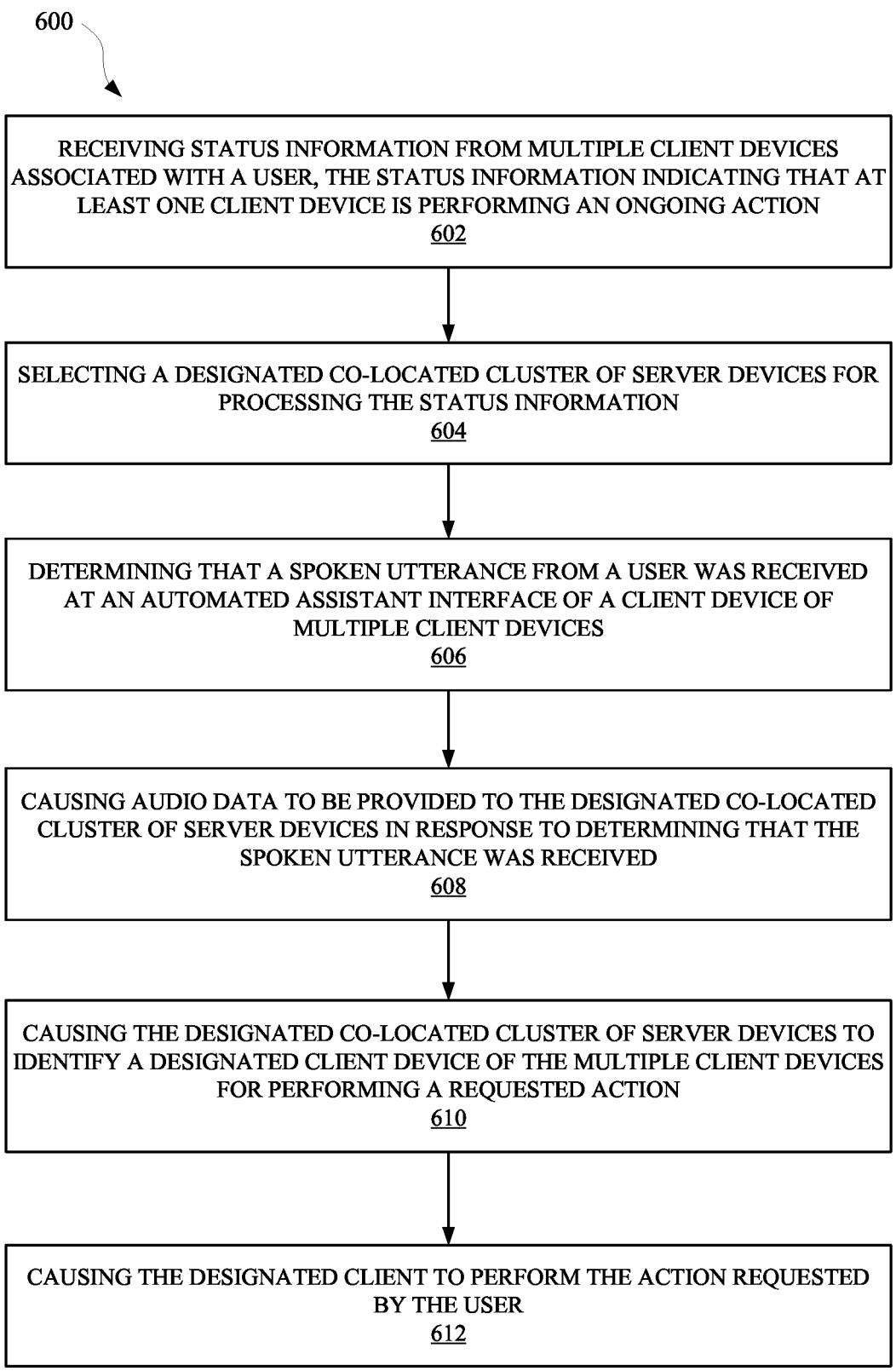
FIG. 6 illustrates a method for selecting a co-located cluster of server devices to process status information from multiple client devices and select a target client device to perform an action, based on an outcome of processing the status information.

FIG. 6 illustrates a method 600 for selecting a co-located cluster of server devices to process status information from multiple client devices and select a target client device to perform an action, based on an outcome of processing the status information. The method 600 can be performed by one or more computing devices, server devices, applications, and/or any other apparatus or module capable of interacting with an automated assistant.

The method 600 can include an operation 602 of receiving status information from multiple client devices associated with a user. The status information can indicate that at least one client device is performing an ongoing action. The multiple client devices can be disposed about a location, such as a home of the user, and can include devices connected over a local area network, and/or one or more other connections, such as over a near-field communications channel. The status information can be provided by the multiple client devices periodically, in order that the status information can processed more readily by any receiving server devices, as opposed to waiting on the user to make a request before sending the status information.

The method 600 can further include an operation 604 of selecting a designated co-located cluster of server devices for processing the status information. The designated co-located cluster of server devices can be selected from multiple different co-located clusters of server devices that are located in multiple different geographic areas, respectively. In some implementations, the designated co-located cluster of server devices can be selected based on the status information indicating that one or more user accounts associated with one or more user devices is predicted to be subject to a request from a user. The selection of the co-located cluster of server devices can be based on processing the status information using a machine learning model and/or a function that otherwise uses the status information as input and provides the selection of the co-located cluster of server devices as output.

The method 600 can also include an operation 606 of determining that a spoken utterance from a user was received at an automated assistant interface of a client device of multiple client devices. The user can be requesting that a particular action be initialized, modified, stopped, and/or requesting that particular information be provided to the user. However, the request can be ambiguous as to the device from which the user intends a response to be provided. For instance, the user may have provided a request for information from an automated assistant, and the spoken utterance that includes the request can be received at multiple client devices. Therefore, the automated assistant should determine a suitable device from which to respond to the user.

The method 600 can further include an operation 608 of causing audio data to be provided to the designated co-located cluster of server devices in response to determining that the spoken utterance was received. The audio data can be provided by at least one client device of the multiple client devices that acknowledged and/or heard the spoken utterance from the user. In some implementations, the multiple client devices can perform a local arbitration to select the client device that will be designated for providing the audio data to the designated co-located cluster of server devices. The arbitration can comprise, for example, causing each client device of the multiple client devices to share a loudness metric with each other. The loudness metric can characterize a loudness at which a particular client device heard the spoken utterance. A device that determines they heard the spoken utterance the loudest compared to the other client devices of the multiple client devices can then transmit the received audio data to the designated co-located cluster of server devices. In some implementations, a client device that determines it is most proximate to the user relative to other client devices can be designated to transmit the audio data to the co-located cluster of server devices. In other implementations, the client device that is designated to provide the audio data to the co-located cluster of server device can be determined based on contextual data and/or one or more dynamic regulations discussed herein. In some implementations, the client device that is designated to provide the audio data to the co-located cluster of server devices can be determined based on which client device acknowledged receipt of the spoken utterance first. This determination can be made based on time stamps transmitted between client devices indicating a time at which each device heard the spoken utterance, therefore each of the client devices can individually determine whether they heard the spoken utterance first.

The method 600 can also include an operation 610 of causing the designated co-located cluster of server devices to identify a designated client device of the multiple client devices for performing the action. The designated client device for performing the action can be identified by the designated co-located cluster of server devices. In some implementations, the designated co-located cluster of server devices can select the designated client device for performing the action based on processing contextual data, including but not limited to the status information, and one or more dynamic regulations accessible to the designated co-located cluster of server devices. In this way, rather than multiple co-located clusters of server devices processing the same information, thereby wasting computational and network resources, a single co-located cluster of server devices can be designated for processing such information. Furthermore, this can reduce latency that might otherwise occur when a user provides a spoken utterance that is then received by multiple assistant-enabled devices that may be associated with different primary accounts, and therefore communicate with different servers.

The method 600 can further include an operation 612 of causing the designated client device to perform the action requested by the user. The designated client device can be caused to perform the action based on an output of the designated co-located cluster of server devices that is directed to the designated client device, and/or the other client devices that are co-located at a location with the designated client device. In some implementations, should the designated co-located cluster of server devices identify a tie between two or more candidate client devices to perform the action, the designated co-located cluster of server devices can access and/or receive information relevant for resolving the tie, as discussed herein.

Figure 7:
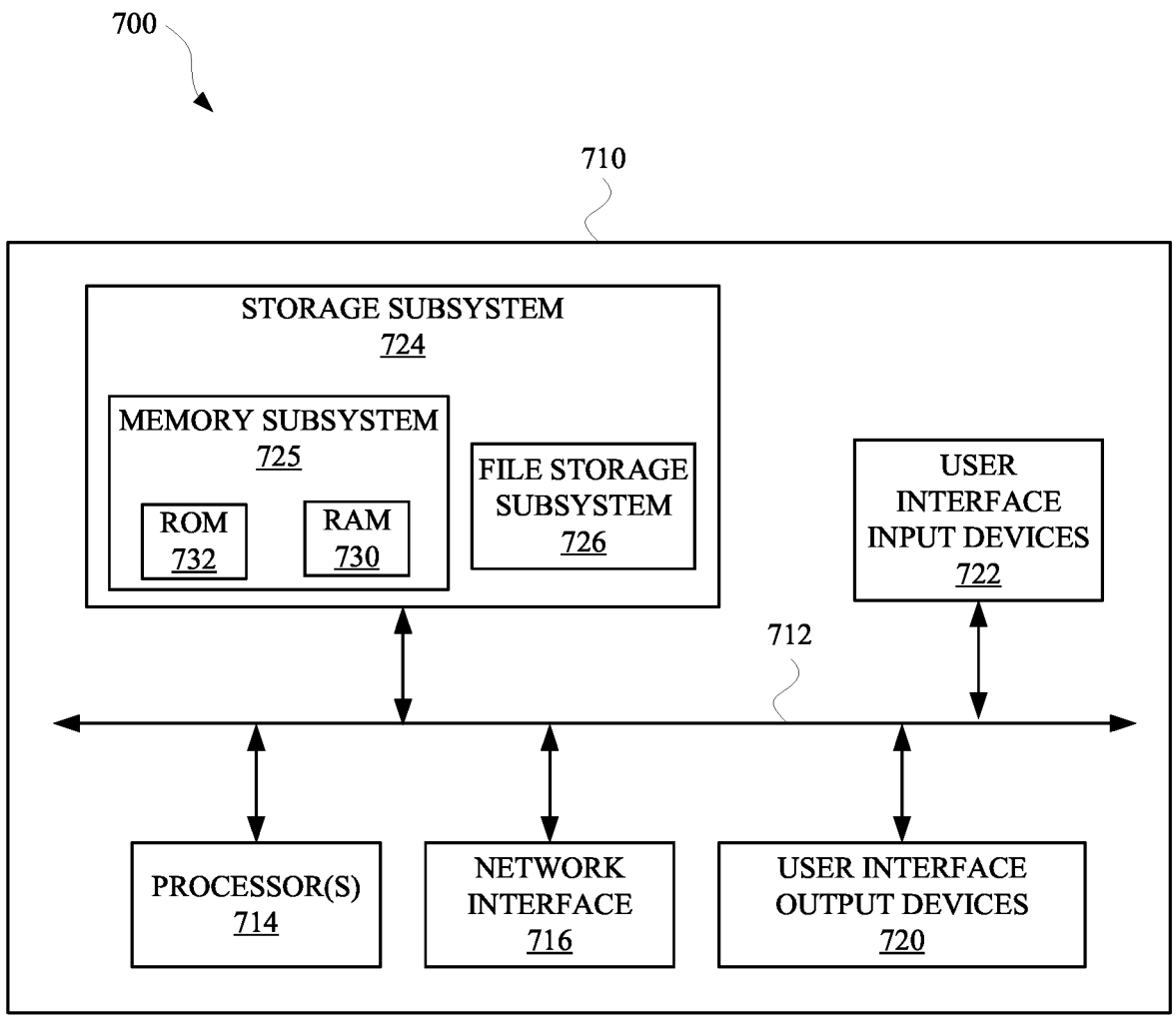
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500, method 512, method 600, and/or to implement one or more of an automated assistant, assistant device 104, assistant device 118, television 128, vehicle automated assistant 106, client automated assistant 120, television automated assistant 130, client device 202, remote computing device 208, a server device, local device, client device, and/or any other apparatus or module discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining that a spoken utterance has been received at a first client device, wherein the spoken utterance is provided by a user in furtherance of communicating with an automated assistant that is accessible via an assistant interface of the first client device, and the spoken utterance is received by multiple client devices that include the first client device;
   receiving, from a second client device that received the spoken utterance, a communication wherein the communication provided by the second client device includes first contextual data that characterizes a context associated with a second operating status of the second client device;
   determining second contextual data that characterizes another context associated with a first operating status of the first client device;
   determining rankings for the multiple client devices, wherein the rankings include at least a first rank based on the first contextual data and a second rank based on the second contextual data, and wherein each rank of the rankings at least partially influences a selection of a particular client device of the multiple client devices to respond to the spoken utterance,
   when a candidate client device of the multiple client devices has a corresponding rank that is distinguished from other ranks of the rankings:
      causing, at least based on the corresponding rank of the rankings, the automated assistant to respond to the spoken utterance via the candidate device, and
   when two or more client devices of the multiple client devices have respective ranks that cause a tie ranking between the two or more client devices:
      determining supplemental contextual data that characterizes traits of the two or more client devices, and
      causing, based on the supplemental contextual data, the tie rank to be resolved in a favor of a respective client device whose ranking is distinguished from rankings of other client devices of the multiple client devices.

2. The method of claim 1, wherein the communication is received from the second client device before the spoken utterance is received by the first client device.

3. The method of claim 2, wherein determining the rankings is performed before the spoken utterance is received at the first client device or while the spoken utterance is being received at the first client device.

4. The method of claim 1, further comprising:
   generating the second contextual data before the spoken utterance is received at the first client device, and
   causing a network interface to provide a separate communication to the second client device, wherein the second client device is configured to determine whether the second client device will be tasked with responding to the spoken utterance via the automated assistant.

5. The method of claim 1, further comprising:
   sending a separate communication to a separate device that, is in communication with the first client device but, has not acknowledged the spoken utterance, and
   determining whether the separate device will be tasked with responding to the spoken utterance via the automated assistant.

6. The method of claim 1, wherein the communication from the second client device that received the spoken utterance is in response to the second client device receiving the spoken utterance.

7. A non-transitory computer readable storage medium configured to store instructions that, when executed by one or more processors, cause the one or more processors to perform operations that include:
   determining that a spoken utterance has been received at a first client device, wherein the spoken utterance is provided by a user in furtherance of communicating with an automated assistant that is accessible via an assistant interface of the first client device, and the spoken utterance is received by multiple client devices that include the first client device;
   receiving, from a second client device that received the spoken utterance, a communication wherein the communication provided by the second client device includes first contextual data that characterizes a context associated with a second operating status of the second client device;
   determining second contextual data that characterizes another context associated with a first operating status of the first client device;
   determining rankings for the multiple client devices, wherein the rankings include at least a first rank based on the first contextual data and a second rank based on the second contextual data, and wherein each rank of the rankings at least partially influences a selection of a particular client device of the multiple client devices to respond to the spoken utterance,
when a candidate client device of the multiple client devices has a corresponding rank that is distinguished from other ranks of the rankings:
causing, at least based on the corresponding rank of the rankings, the automated assistant to respond to the spoken utterance via the candidate device, and
when two or more client devices of the multiple client devices have respective ranks that cause a tie ranking between the two or more client devices:
determining supplemental contextual data that characterizes traits of the two or more client devices, and
causing, based on the supplemental contextual data, the tie rank to be resolved in a favor of a respective client device whose ranking is distinguished from rankings of other client devices of the multiple client devices.

8. The non-transitory computer readable medium of claim 7, wherein the communication is received from the second client device before the spoken utterance is by the first client device.

9. The non-transitory computer readable medium of claim 8, wherein determining the rankings is performed before the spoken utterance is received at the first client device or while the spoken utterance is being received at the first client device.

10. The non-transitory computer readable medium of claim 7, wherein the operations further include:
generating the second contextual data before the spoken utterance is received at the first client device, and
causing a network interface to provide a separate communication to the second client device, wherein the second client device is configured to determine whether the second client device will be tasked with responding to the spoken utterance via the automated assistant.

11. The non-transitory computer readable medium of claim 7, wherein the operations further include:
sending a separate communication to a separate device that, is in communication with the first client device but, has not acknowledged the spoken utterance, and
determining whether the separate device will be tasked with responding to the spoken utterance via the automated assistant.

12. The non-transitory computer readable medium of claim 7, wherein the communication from the second client device that received the spoken utterance is in response to the second client device receiving the spoken utterance.

13. A system, comprising:
one or more processors; and
memory configured to store instructions that, when executed by the one or more processors, cause the one or more processors to perform operations that include:
determining that a spoken utterance has been received at a first client device, wherein the spoken utterance is provided by a user in furtherance of communicating with an automated assistant that is accessible via an assistant interface of the first client device, and the spoken utterance is received by multiple client devices that include the first client device;
receiving, from a second client device that received the spoken utterance, a communication wherein the communication provided by the second client device includes first contextual data that characterizes a context associated with a second operating status of the second client device;
determining second contextual data that characterizes another context associated with a first operating status of the first client device;
determining rankings for the multiple client devices, wherein the rankings include at least a first rank based on the first contextual data and a second rank based on the second contextual data, and wherein each rank of the rankings at least partially influences a selection of a particular client device of the multiple client devices to respond to the spoken utterance,
when a candidate client device of the multiple client devices has a corresponding rank that is distinguished from other ranks of the rankings:
causing, at least based on the corresponding rank of the rankings, the automated assistant to respond to the spoken utterance via the candidate device, and
when two or more client devices of the multiple client devices have respective ranks that cause a tie ranking between the two or more client devices:
determining supplemental contextual data that characterizes traits of the two or more client devices, and
causing, based on the supplemental contextual data, the tie rank to be resolved in a favor of a respective client device whose ranking is distinguished from rankings of other client devices of the multiple client devices.

14. The system of claim 13, wherein the communication is received from the second client device before the spoken utterance is received by the first client device.

15. The system of claim 14, wherein determining the rankings is performed before the spoken utterance is received at the first client device or while the spoken utterance is being received at the first client device.

16. The system of claim 13, wherein the operations further include:
Generating the second contextual data before the spoken utterance is received at the first client device, and
causing a network interface to provide a separate communication to the second client device, wherein the second client device is configured to determine whether the second client device will be tasked with responding to the spoken utterance via the automated assistant.

17. The system of claim 13, wherein the operations further include:
sending a separate communication to a separate device that, is in communication with the first client device but, has not acknowledged the spoken utterance, and
determining whether the separate device will be tasked with responding to the spoken utterance via the automated assistant.

18. The system of claim 13, wherein the communication from the second client device that received the spoken utterance is in response to the second client device receiving the spoken utterance.

* * * * *